(12) United States Patent

Morita

(10) Patent No.: US 9,134,502 B2
(45) Date of Patent: Sep. 15, 2015

(54) DRIVE APPARATUS OF VIBRATION-TYPE ACTUATOR, INTERCHANGEABLE LENS, AND IMAGE PICKUP APPARATUS USING THE SAME

(71) Applicant: CANON KABUSHIKI KAISHA, Tokyo (JP)

(72) Inventor: Hiromitsu Morita, Sakado (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/552,195

(22) Filed: Nov. 24, 2014

(65) Prior Publication Data

US 2015/0146080 A1    May 28, 2015

(30) Foreign Application Priority Data

Nov. 27, 2013  (JP) .................................. 2013-244999
Nov. 7, 2014   (JP) .................................. 2014-227260

(51) Int. Cl.
  G02B 7/04     (2006.01)
  H02N 2/06     (2006.01)
  H04N 5/232    (2006.01)

(52) U.S. Cl.
  CPC ............... *G02B 7/04* (2013.01); *H02N 2/062* (2013.01); *H04N 5/23212* (2013.01)

(58) Field of Classification Search
  CPC ....... G02B 7/04; H02N 2/062; H02N 5/23212
  See application file for complete search history.

(56) References Cited

U.S. PATENT DOCUMENTS

| 7,755,251 B2 * | 7/2010 | Kudo ............................. 310/317 |
| 2012/0177354 A1 * | 7/2012 | Ashizawa et al. ............. 396/133 |
| 2014/0009846 A1 * | 1/2014 | Murakami .................... 359/824 |

FOREIGN PATENT DOCUMENTS

| JP | 10-210775 A   | 8/1998 |
| JP | 11-178370 A   | 7/1999 |
| JP | 2009-271425 A | 11/2009 |
| JP | 2012-110228 A1 | 6/2012 |

* cited by examiner

*Primary Examiner* — W B Perkey
(74) *Attorney, Agent, or Firm* — Canon USA Inc IP Division

(57) ABSTRACT

When a vibration-type actuator is in a non-driving period, at least one of a voltage amplitude and a phase difference of an alternate signal applied to an electrode of a piezoelectric element is set to be equal to a minimum value or a maximum value of a dead zone in terms of the voltage amplitude or the phase difference.

20 Claims, 19 Drawing Sheets

DRIVE APPARATUS OF VIBRATION-TYPE ACTUATOR, INTERCHANGEABLE LENS, AND IMAGE PICKUP APPARATUS USING THE SAME

BACKGROUND OF THE INVENTION

1. Field of the Invention

The present invention relates to a drive apparatus using a vibration-type actuator, an interchangeable lens, or an image pickup apparatus, for example, a drive apparatus of a vibration-type actuator suitable for driving a focus lens of a camera by using a wobbling operation.

2. Description of the Related Art

Various proposals have been made in terms of a vibration-type actuator capable of generating an elliptic motion on a particular point thereby driving an element (for example, see Japanese Patent Laid-Open No. 10-210775). FIG. 16 illustrates an example of a proposed structure.

As illustrated in FIG. 16, a vibrator of this vibration-type actuator includes an elastic element 1 made of a rectangular-shaped plate of a metallic material, and a piezoelectric element 2 bonded to a back surface of the elastic element 1. A plurality of protruding parts 3 are formed at particular positions on an upper surface of the elastic element 1. With this structure, when an alternate current (AC) voltage is applied to the piezoelectric element 2, a second-order bending vibration in a direction along longer sides of the elastic element 1 and a first-order bending vibration in a direction along shorter sides of the elastic element 1 occur simultaneously, which excite the protruding parts 3 to have an elliptic motion. In this situation, if there is a driven element 4 pressed into a contact with the protruding parts 3, the element 4 is driven linearly by the elliptic motion of the protruding parts 3.

The piezoelectric element 2 has two electrodes A1 and A2 separated from each other as illustrated in FIG. 17. When AC voltages V1 and V2 with an equal phase are applied to the two electrodes A1 and A2, a first-order bending vibration is excited such that the rectangular elastic element 1 has two nodes extending in the direction parallel to the longer sides as illustrated in FIG. 18A. When AC voltages V1 and V2 with opposite phases are applied to the two electrodes A1 and A2, a second-order bending vibration is excited such that the rectangular elastic element 1 has three nodes extending in the direction parallel to the shorter sides as illustrated in FIG. 18B. By exciting the elliptic motion on the protruding parts 3 by a combination of first-order and second-order bending vibrations (vibration modes) while pressing the driven element 4 into the contact with the protruding parts 3, it is possible to linearly drive the driven element 4.

The first-order bending vibration illustrated in FIG. 18A causes the protruding parts 3 to have a vibration whose amplitude varies in a direction perpendicular to a contact surface at which the driven element 4 is in contact with the protruding parts 3 (hereinafter such an amplitude will be referred to as a Z-axis amplitude). The second-order bending vibration illustrated in FIG. 18B causes the protruding parts 3 to have a vibration whose amplitude varies in a direction parallel to a direction in which the driven element 4 is driven (hereinafter such an amplitude will be referred to as an X-axis amplitude). Use of a combination of the first-order bending vibration and the second-order bending vibration makes it possible to excite the protruding parts 3 to have an elliptic motion as illustrated in FIG. 19. An ellipticity ratio of the elliptic motion is given by the ratio of the magnitude of the Z-axis amplitude and the magnitude of the X-axis amplitude. By changing the phase difference between the applied AC voltages V1 and V2, it is possible to change the magnitude of the X-axis amplitude. By changing the voltage amplitudes of the AC voltages V1 and V2, it is possible to change the magnitude of the Z-axis amplitude. Thus, it is possible to adjust the ellipticity ratio of the elliptic motion excited on the protruding parts 3.

By setting the frequency of the AC voltages applied to the piezoelectric element 2 so as to be closer to the resonance frequency of the vibrator, it is possible to increase the drive speed. By setting the frequency of the AC voltages applied to the piezoelectric element 2 so as to be more different from the resonance frequency of the vibrator, it is possible to reduce the drive speed. For example, in the basic structure of the vibration-type actuator illustrated in FIG. 16, there is a relationship between the drive frequency and the drive speed as shown in FIG. 20. That is, the actuator has a characteristic that the drive speed has its peak at the resonance frequency of the vibrator, and the drive speed decreases gradually as the drive frequency increases in a range higher than the resonance frequency but sharply as the drive frequency decreases in a range lower than the resonance frequency.

Thus, in the vibration-type actuator having such a characteristic, it is possible to control the speed (by the frequency) by changing the frequency of the two AC voltages V1 and V2 applied to the piezoelectric element 2. Furthermore, it is possible to control the speed (by the phase difference) by changing the phases of the AC voltages V1 and V2. Still furthermore, it is possible to control the speed (by the voltage) by changing the voltage amplitudes of the two AC voltages V1 and V2 applied to the piezoelectric element 2.

Thus, it is possible to control the speed of the vibration-type actuator by a combination of the control by the frequency, the control by the phase difference, and the control by the voltage.

SUMMARY OF THE INVENTION

However, when the vibration-type actuator is moved or stopped by the speed control such as the ellipticity control, an abrupt change in vibration occurs at points A and B as illustrated in FIG. 21. This phenomenon occurs when the driving force of the vibration-type actuator is not sufficiently large compared with frictional force at the contact-by-pressure part of the vibration-type actuator. When this phenomenon occurs, rather large abnormal noise is generated. In particular, in a case where the vibration-type actuator is used to drive a focus lens of a camera, a small back-and-forth driving operation (hereinafter also referred to as a wobbling operation) is performed to move and stop the lens along an optical axis repeatedly many times and thus abnormal noise is generated many times during the wobbling operation. Thus, an annoying situation may occur during the wobbling operation.

According to an aspect of the present invention, a drive apparatus of a vibration-type actuator includes an alternate current signal generation unit configured to generate a first alternate current signal applied to a first electrode of an electric-mechanical energy conversion element of a vibrator and a second alternate current signal applied to a second electrode of the electric-mechanical energy conversion element, and a control unit configured to set a voltage amplitude of the first alternate current signal and a voltage amplitude of the second alternate current signal such that when the vibrator is in a non-movement state, the voltage amplitudes are set to be greater than 0 and to be in a dead zone, wherein the dead zone is a range of the voltage amplitudes of the first alternate current signal and the second alternate current signal applied to the electric-mechanical energy conversion element, within which no driving force on a driven element is generated.

According to an aspect of the present invention, a drive apparatus of a vibration-type actuator includes an alternate current signal generation unit configured to generate a first alternate current signal applied to a first electrode of an electric-mechanical energy conversion element of a vibrator and a second alternate current signal applied to a second electrode of the electric-mechanical energy conversion element, and a control unit configured to set a phase difference between the first alternate current signal and the second alternate current signal such that when the vibrator is in a non-movement state, the phase difference is set to a value in a dead zone other than 0, wherein the dead zone is a range of the phase difference between the first alternate current signal and the second alternate current signal applied to the electric-mechanical energy conversion element, within which no driving force on a driven element is generated.

Further features of the present invention will become apparent from the following description of exemplary embodiments with reference to the attached drawings.

DESCRIPTION OF THE EMBODIMENTS

Embodiments of the present inventions are described below with reference to drawings.

First Embodiment

In a first embodiment of the invention, a drive apparatus of a vibration-type actuator is described that controls a speed by adjusting a drive frequency (a frequency of an AC signal).

First, a driving mechanism for driving a driven element by the vibration-type actuator according to the first embodiment is described below taking as an example a focus lens driving mechanism in a camera used as an image pickup apparatus with reference to FIG. 1.

The driving mechanism for driving the driven element by the vibration-type actuator according to the present embodiment includes at least following elements. That is, the driving mechanism includes the driven element firmly connected to a vibrator including electric-mechanical energy conversion element and an elastic element on which at least two contact elements are formed, and a first first guide bar and a second second guide bar disposed in parallel so as to slidably hold the driven element.

Figure 16:
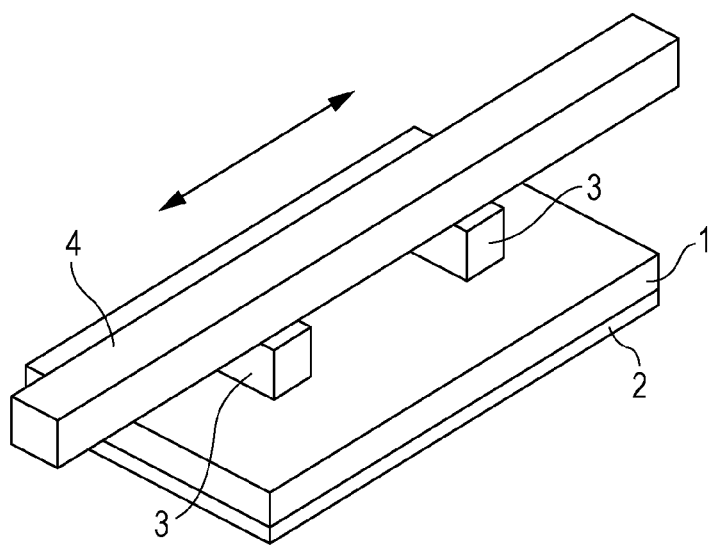
FIG. 16 is an external perspective view illustrating a basic structure of a vibration-type actuator.
Figure 17:
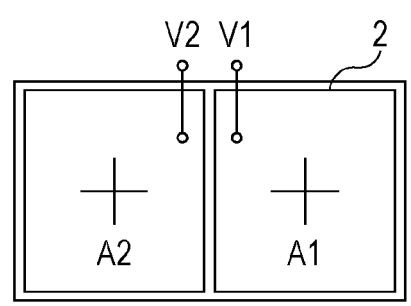
FIG. 17 is a schematic diagram illustrating a multi-electrode area of a piezoelectric element of the vibration-type actuator illustrating in FIG. 16.
Figure 18A:
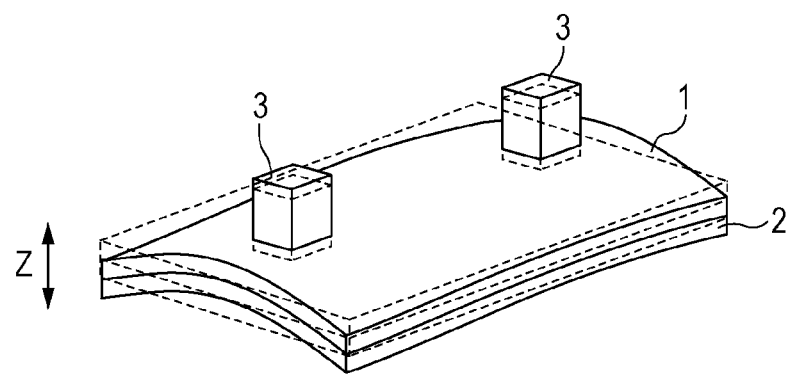
FIGS. 18A and 18B are perspective views illustrating vibration modes of a vibrator.
Figure 18B:
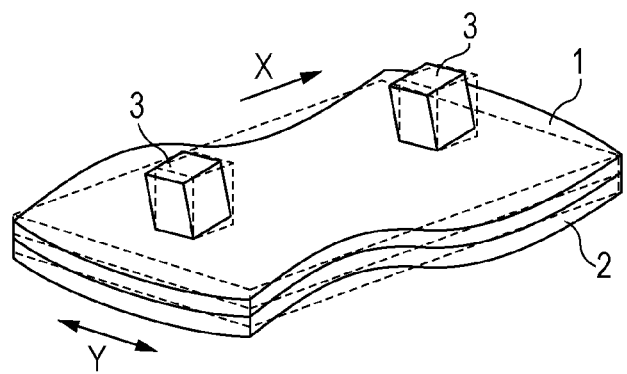
Figure 19:
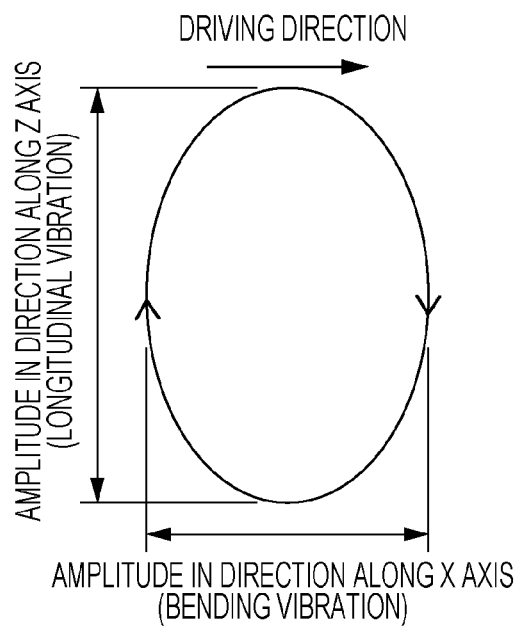
FIG. 19 is a diagram illustrating an elliptic motion excited on protruding parts of an elastic element.
Figure 20:
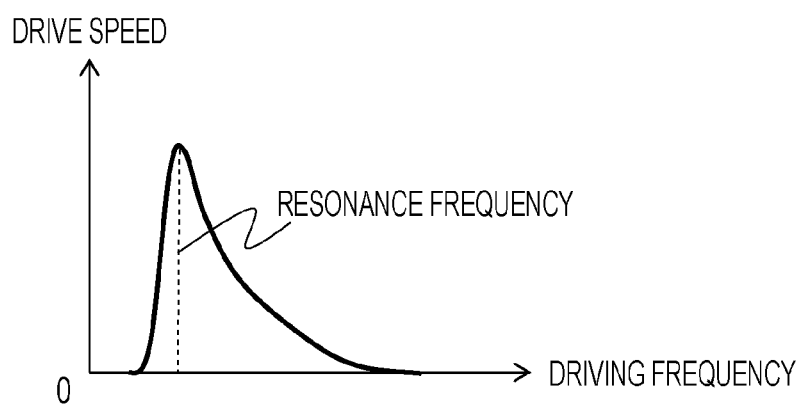
FIG. 20 is a diagram illustrating a relationship between a drive frequency and a drive speed of a vibration-type actuator.
Figure 21:
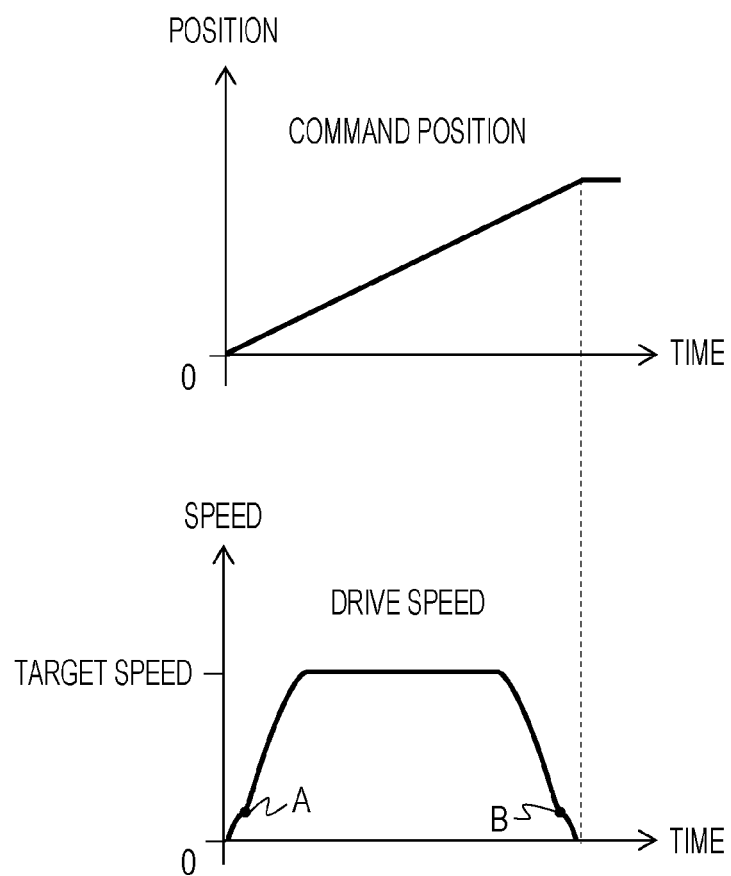
FIG. 21 is a diagram illustrating a relationship between a commanded position and a drive speed of a vibration-type actuator.

When a driving voltage is applied to the electric-mechanical energy conversion element, an elliptic motion is generated on the contact elements of the vibrator, which causes a relative driving force to act between the vibrator and the second guide bar in contact with the contact elements of the vibrator thereby moving the driven element along the first and second guide bars. A specific structure and an operation principle of the vibrator may be similar to those illustrated in FIG. 16.

Figure 1:
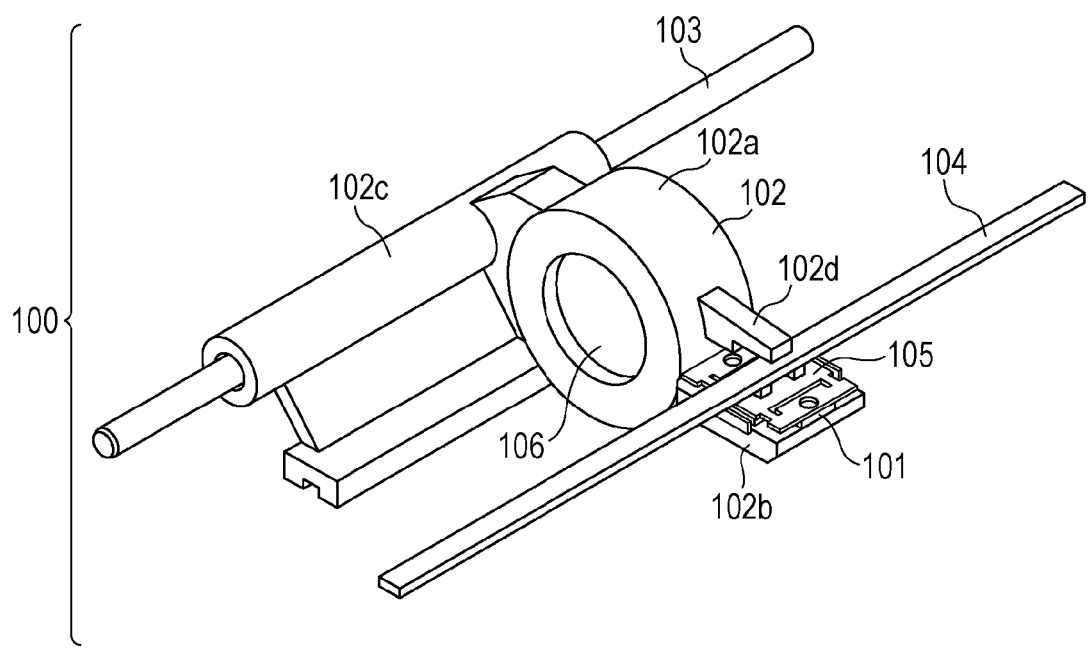
FIG. 1 is a diagram illustrating a driving mechanism of a vibration-type actuator used, by way of example, as a focus lens drive apparatus, according to an embodiment.

More specifically, as illustrated in FIG. 1, the driving mechanism 100 configured to drive the driven element by the vibration-type actuator according to the present embodiment mainly includes a lens holder 102, a lens 106, a vibrator 101, a pressure magnet 105, two guide bars 103 and 104, and a non-illustrated base. In an automatic focusing operation, the lens 106 is driven by the driving mechanism in one of directions along an optical axis. Note that an image pickup apparatus (not illustrated) is disposed on the optical axis.

The two guide bars, that is, the first guide bar 103 and the second guide bar 104 are disposed in parallel to each other and both ends of each guide bar are firmly held by a non-illustrated base.

The vibrator 101 includes an elastic element in the form of a plate made of a metal and an electric-mechanical energy conversion element, which are bonded together into a single piece. Reference numeral 102 denotes a driven element including a cylindrical-shaped holder element 102a, a holder element 102b that firmly holding the vibrator 101 and a pressure magnet 105, a first guide element 102c functioning as a guide in cooperation with a first guide bar 103 fitted in the first guide element 102c, and an engagement element 102d opposing the holder element 102b via a second guide bar 104.

The at least two contact elements of the vibrator 101 are pressed into contact with the second guide bar 104 by magnetic force provided by the pressure magnet 105.

Figure 2A:
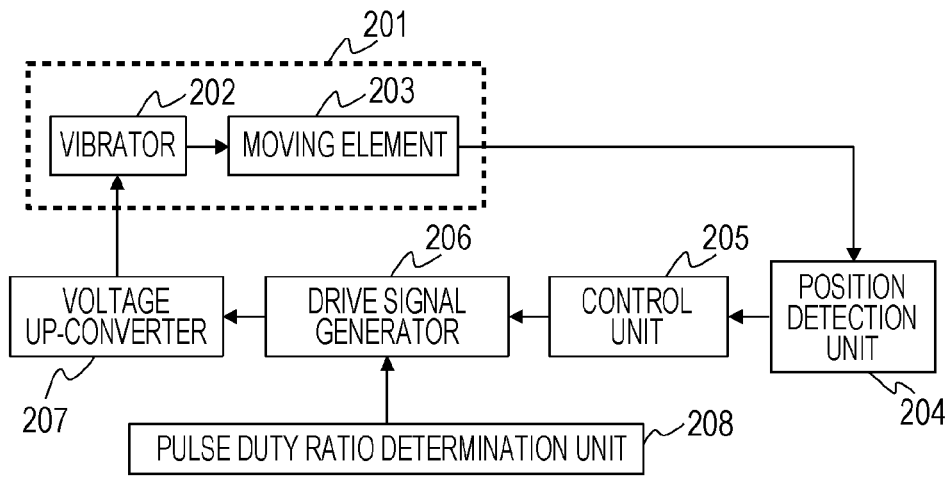
FIGS. 2A and 2B are block diagrams illustrating a drive apparatus of the vibration-type actuator.
Figure 2B:
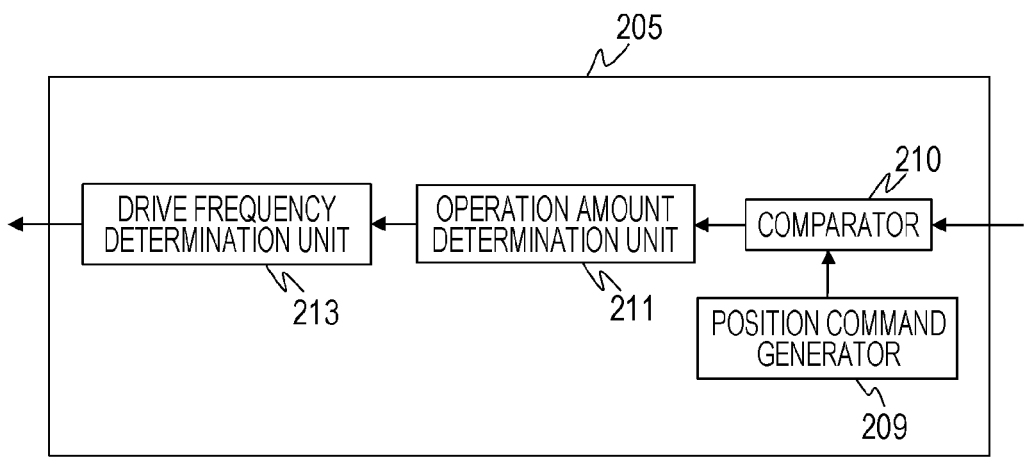
Figure 2C:
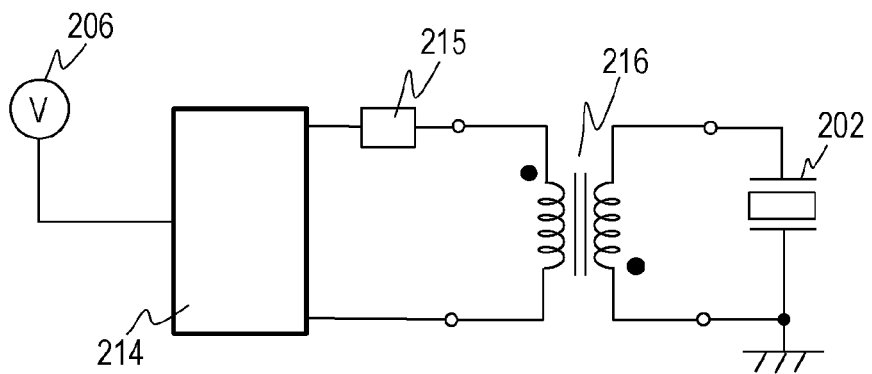
FIG. 2C is a circuit diagram thereof.

Next, the drive apparatus of the vibration-type actuator according to the present embodiment is described below with reference to FIGS. 2A to 2C. FIGS. 2A and 2B are block diagrams illustrating a configuration of the drive apparatus of the vibration-type actuator according to the first embodiment, and FIG. 2C is a circuit diagram thereof.

As illustrated in FIG. 2A, the vibration-type actuator 201 includes a vibrator 202 and a driven element 203. The driven element 203 is driven by an elliptic motion excited on protruding parts of the vibrator 202. A position detection unit 204 detects a relative position between the vibrator 202 and the driven element 203. For example, as for the position detection unit 204, a detection unit may be used that is configured to detect a position of the vibrator 202 or the driven element 203. More specifically, for example, a linear encoder may be used. An output of the position detection unit 204 is connected to a control unit 205. The control unit 205 includes, as illustrated in FIG. 2B, a position control generation unit 209, a comparison unit 210, an operation amount determination unit 211, and a drive frequency determination unit 213. The comparison unit 210 compares a detected position output from the position detection unit 204 with a target position output from the position control generation unit 209. In the present disclosure, a deviation between the detected position and the target position is a control error.

The operation amount determination unit 211 calculates an operation amount to be applied to the vibration-type actuator based on a result of comparison made by the comparison unit 210. The operation amount determination unit 211 may be realized, for example, by a PID control unit. An output of the operation amount determination unit 211 is connected to the drive frequency determination unit 213 that sets a frequency of a AC signal. The drive frequency determination unit 213 also sets a drive frequency of a AC signal applied to the vibrator 202 based on the output of the operation amount determination unit 211. That is, in the present embodiment, the speed of the driven element is controlled by adjusting the drive frequency depending on the control error.

An output of the drive frequency determination unit 213 is connected to a drive signal generation unit 206. The drive signal generation unit 206 generates pulse signals with two phases having the drive frequency determined by the drive frequency determination unit 213. The drive signal generation unit 206 is connected to the pulse duty ratio determination unit 208. The pulse duty ratio determination unit is configured to be capable of setting a pulse duty ratio for each of pulse signals of two phases generated by the drive signal generation unit 206. AC signals are output such that a voltage amplitude of each AC signal changes according to the pulse duty ratio of the corresponding one of the pulse signals, and thus it is possible to control the voltage amplitude of each AC signal by changing the pulse duty ratio of the pulse signal. Note that the pulse duty ratio refers to as a ratio of a pulse width to a pulse period.

The pulse duty ratio of the pulse signals of the two phases are set in a range lower than an upper limit threshold value set to 50%. The closer to the upper limit threshold value the pulse duty ratio is, the greater the amplitude of the elliptic motion excited on the protruding parts of the vibration-type actuator, and thus the greater the movement speed of the driven element is. An output of the drive signal generation unit 206 is connected to a voltage up-converter 207.

The voltage up-converter 207 includes, as illustrated in FIG. 2C, a driver IC 214 (including a switching element), a coil 215, and a transformer 216. The voltage up-converter 207 performs a switching operation on signals according to the pulse signals with the two phases generated by the drive signal generation unit 206, and converts voltages of the signals to upper values using the transformer 216. The resultant up-converted AC signals with two phases are applied to a plurality of electrodes of a piezoelectric element of the vibrator 202.

Figure 3:
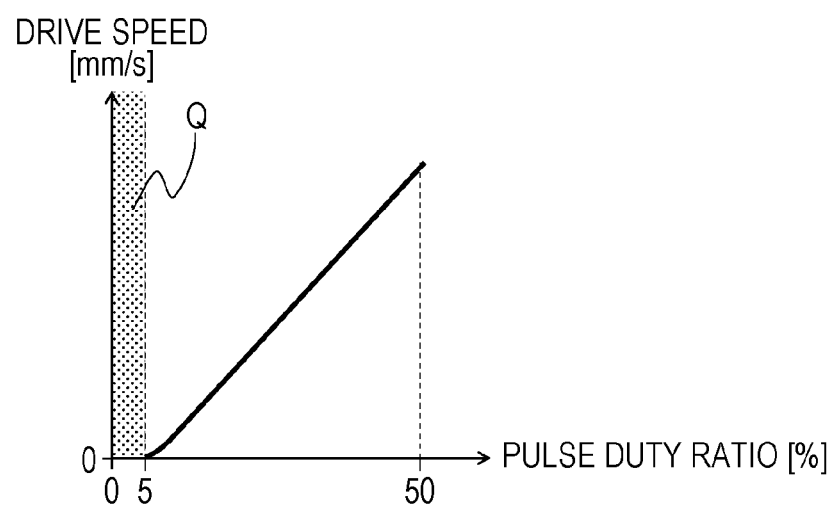
FIG. 3 is a diagram illustrating a relationship between a pulse duty ratio and a dead zone.

Next, a dead zone of the pulse duty ratio is described below referring to FIG. 3. FIG. 3 is a diagram illustrating a relationship between a drive speed and a pulse duty ratio of a AC signal applied to the vibration-type actuator. As may be seen from the example illustrated in FIG. 3, when the pulse duty ratio is changed while maintaining the drive frequency of the AC signals applied to the piezoelectric element and the phase difference between them, the drive speed changes as a particular function of the pulse duty ratio. The Z-axis amplitude and the drive speed decrease as the pulse duty ratio of the AC signals decreases toward 0. However, when the pulse duty ratio is in a range Q, the driving force of the vibration-type actuator is lower than the frictional force at the contact surface of the vibrator, and thus the vibration-type actuator stops. This range Q is also referred to as a dead zone. The size of the range Q varies depending on the characteristic of the vibration-type actuator. To obtain a proper size of the range Q, it may be necessary to correctly recognize the characteristic of the vibration-type actuator in advance.

Figure 4:
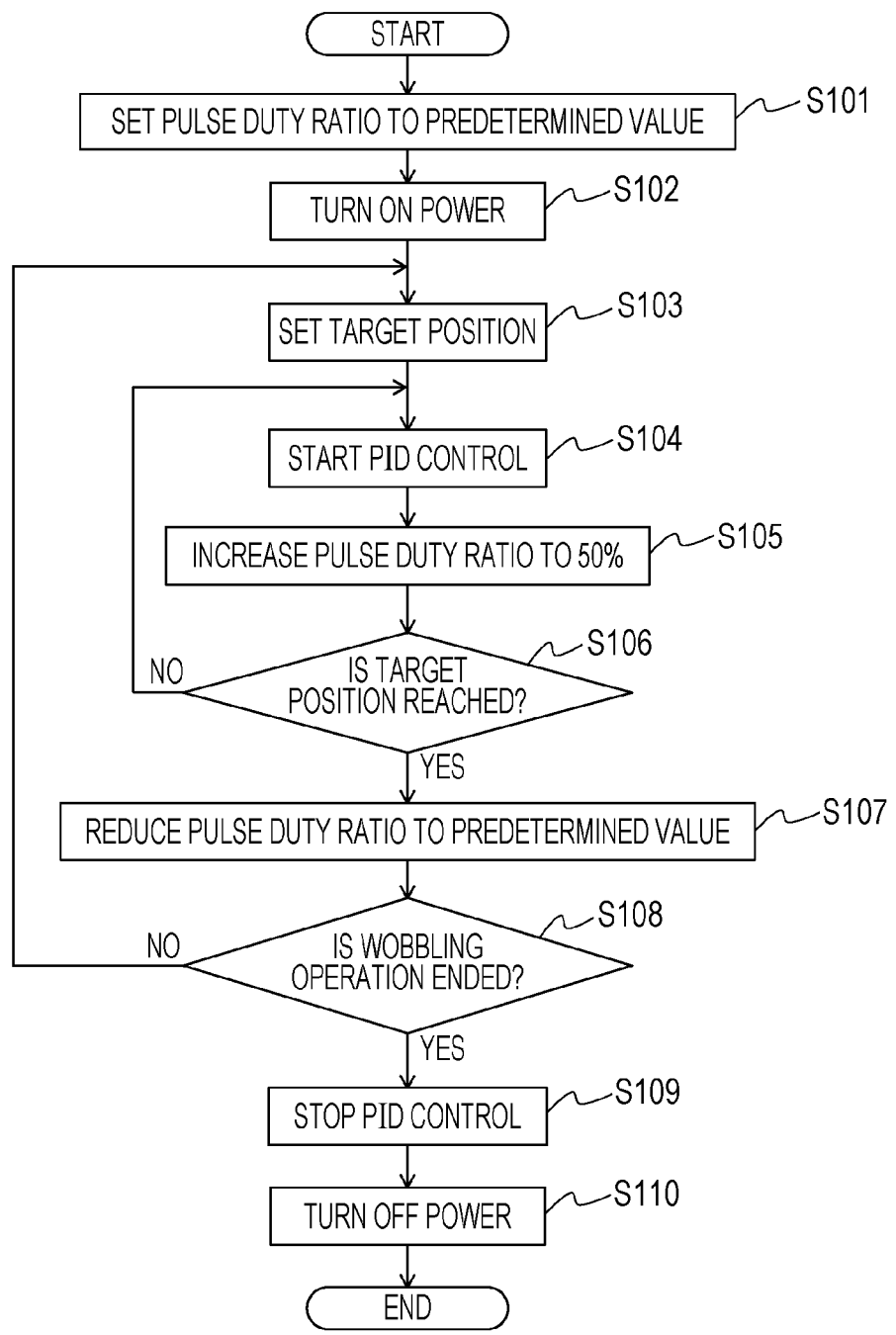
FIG. 4 is a flow chart illustrating a control operation according to an embodiment.

Next, a control operation according to the first embodiment is described below referring to FIG. 4. FIG. 4 is a flow chart associated with a small back-and-forth driving operation (hereinafter also referred to as a wobbling operation) used to drive a focus lens of a camera.

In the wobbling operation, as illustrated in FIG. 4, the pulse duty ratio is set to a predetermined value before the driving operation is started (S101), and the wobbling operation is started from a state in which the AC signals are applied in advance (S102). For example, in a case where the maximum value of the pulse duty ratio in the dead zone is 5% as in the example illustrated in FIG. 3, the above-described predetermined value of the pulse duty ratio may be set to, for example, 5%. In a case where this starting value of the pulse duty ratio is set to a value in the dead zone, the driving force provided by the vibration-type actuator is not sufficiently large compared with the frictional force at the contact surface of the vibrator, and thus no relative movement between the vibrator and the driven element occurs although a vibration of the vibrator may occur. In this state, the vibration is maintained without causing a relative movement to occur, and thus a dynamic friction force is dominant as the frictional force when the driving is started, which makes it possible to start the movement without needing a large force. On the other hand, in a case where the pulse duty ratio is set to 0% out of the dead zone, a static friction force is dominant as the frictional force when the driving is started from a non-movement state, and thus a large force is temporarily necessary. As a result, a relatively large abnormal sound occurs when the driving is started.

For the reasons described above, when the driving is started (during a drive start period), it may be desirable to set the pulse duty ratio of the AC signals to a value within the dead zone in which no relative movement between the driven element and the vibrator occurs when a drive signal is input to the piezoelectric element. In the dead zone Q, the drive speed is 0 when a drive signal is input as may be seen in FIG. 3, and thus, to move the driven element with respect to the vibrator, it is necessary to sweep the pulse duty ratio until the pulse duty ratio reaches a value in a range in which the driven element is allowed to have a speed.

In a case where the pulse duty ratio is swept by a large amount, when the driving of the vibrator (vibration-type drive apparatus) is started, a large force is momentarily applied to the vibrator, which may cause an abnormal sound to occur. That is, in a case where there is a large difference between the pulse duty ratio of the AC signals when the vibrator is in the non-movement state and the pulse duty ratio of the AC signals when the driving of the vibrator is started thereafter, a large change occurs in the pulse duty ratio when the driving is started, and thus a large force is temporarily input to the vibrator, which may cause a vibrator to occur. In view of the above, the pulse duty ratio may be set to the maximum value or the minimum value of the dead zone when the vibrator is in the non-movement state thereby making it possible to more effectively suppress an abnormal sound when the driving is started thereafter. More specifically, for the above purpose, it may be desirable to set the pulse duty ratio in advance to 5% which is the greatest value of the dead zone.

When the vibrator is in the non-movement state, if the pulse duty ratio is within the dead zone Q and is larger than 0, it is possible to suppress an abnormal sound when the driving is started thereafter. More specifically, for example, the pulse duty ratio may be set to a value in a range from the one-half the maximum value to the maximum value of the dead zone to more effectively suppress the abnormal sound when the driving is started.

As described above, by setting the pulse duty ratio to a value within the dead zone and greater than 0, it is possible to suppress the abnormal sound. More specifically, by setting the pulse duty ratio to a value within a range from the one-half the maximum value to the maximum value of the dead zone (in the example described above, within the range from 2.5% to 5.0% of the maximum value), it is possible to more effectively reduce the abnormal sound. Furthermore, by setting the pulse duty ratio to the maximum value of the dead zone, it is possible to further effectively reduce the abnormal sound.

Next, the target position is set (S103), and then the vibration-type actuator is driven using a position feedback control such as a PID control to move the vibrator 202 or the driven element 203 to the target position (S104). The pulse duty ratio is then gradually increased from the predetermined value, i.e., 5% to the upper limit value, i.e., 50% (S105). Next, it is determined whether the relative position between the vibrator 202 and the driven element 203 has reached the target position (S106). In a case where the target position has been reached, the pulse duty ratio is gradually reduced from the upper limit, i.e., 50% to the predetermined value, i.e., 5% (S107) (non-driving period) and the predetermined value is maintained during a period in which the relative position is maintained unchanged at the target position. In a case where the target position is not reached yet, the pulse duty ratio is maintained at 50%, which is the upper limit, to move the relative position between the vibrator 202 and the driven element 203 to the target position using the position feedback control such as the PID control (S104). Finally, it is determined whether the wobbling operation is to be ended (S108). In a case where the wobbling operation is to be ended, the position feedback control such as the PID control is ended (S109), and the power is turned off (S110). In a case where the wobbling operation is further continued, a next target position is set (S103), and moving the vibrator 202 or the driven element 203 toward the target position using the position feedback control such as the PID control is started.

Figure 5:
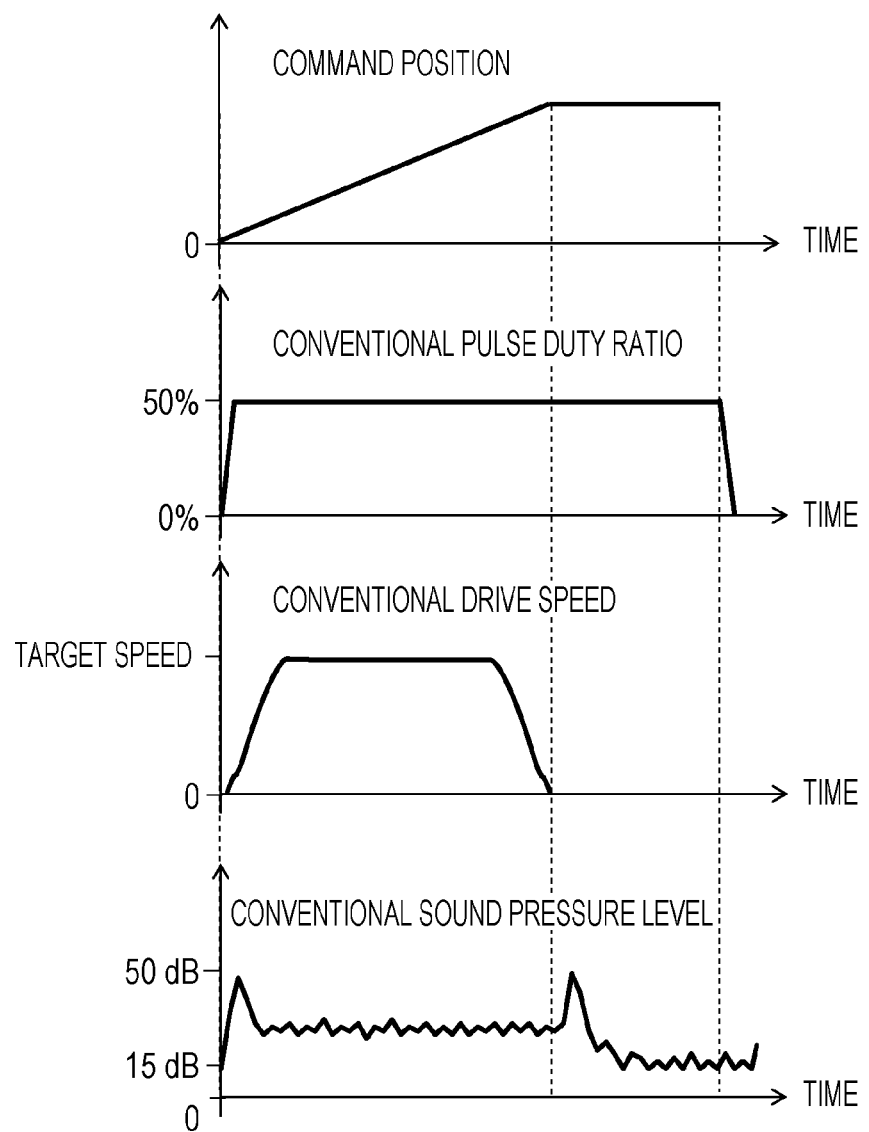
FIG. 5 is a diagram illustrating relationships among a commanded position, a pulse duty ratio, a drive speed, and a sound pressure level, in a drive apparatus of the vibration-type actuator.
Figure 6:
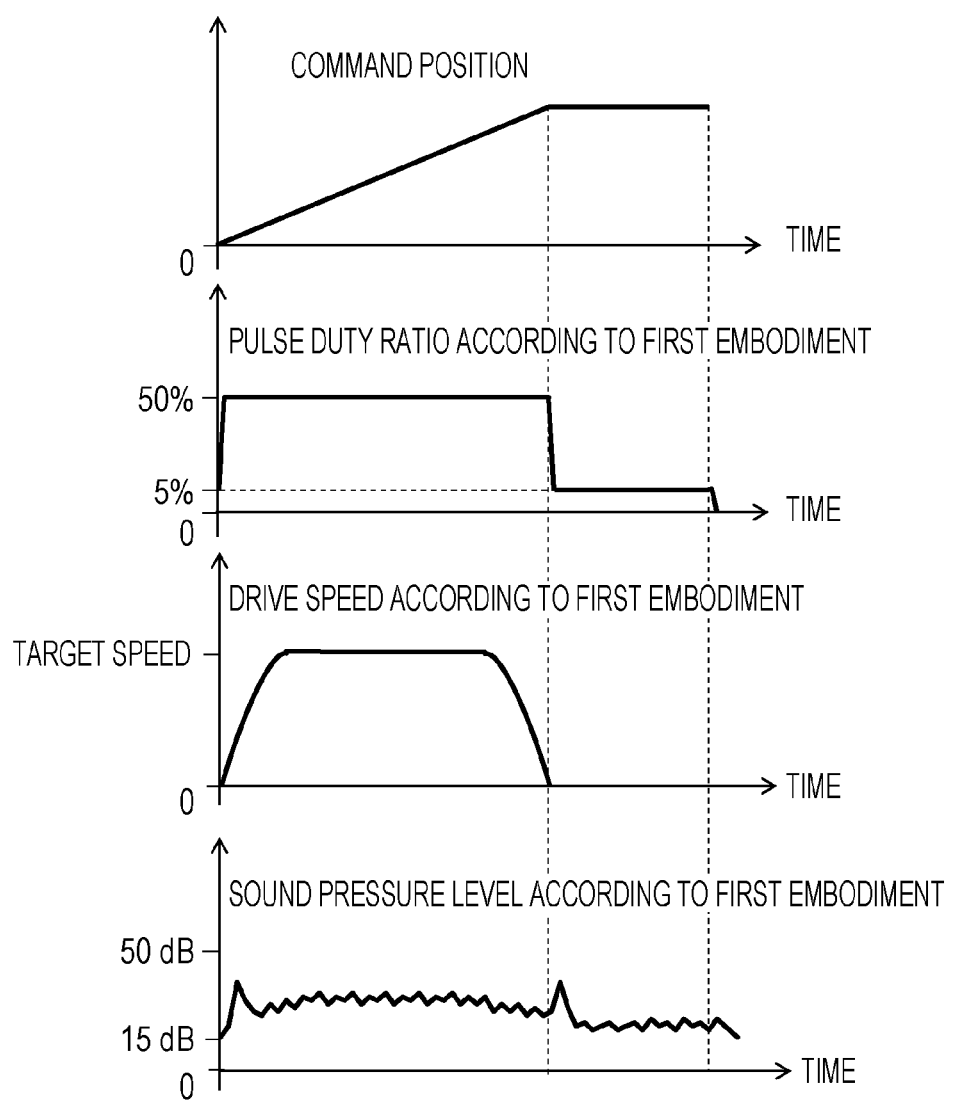
FIG. 6 is a diagram illustrating relationships among a commanded position, a pulse duty ratio, a drive speed, and a sound pressure level, in a drive apparatus of the vibration-type actuator.

Beneficial effects obtained according to the first embodiment are described below referring to FIG. 5. FIG. 5 is a diagram illustrating relationships among the commanded position, the pulse duty ratio, the drive speed, and the sound pressure level when the wobbling operation is performed using a vibration-type actuator according to a conventional technique. FIG. 6 is a diagram illustrating relationships among the commanded position, the pulse duty ratio, the drive speed, and the sound pressure level when the wobbling operation is performed using a vibration-type actuator according to the first embodiment.

As illustrated in FIG. 5, in the conventional technique, when the wobbling operation is started, the pulse duty ratio is increased from 0% to 50% to move the vibration-type actuator. When the wobbling operation is stopped, the pulse duty ratio is maintained unchanged at 50%. When the wobbling operation is ended, the pulse duty ratio is reduced to 0%. In this operation according to the conventional technique, the position feedback control such as the PID control is performed in a range including the dead zone Q (see FIG. 3) of the pulse duty ratio of the signals, and thus an abnormal sound occurs due to an abrupt change in the Z-axis amplitude of the elliptic motion at the contact element. Furthermore, because the pulse duty ratio is maintained at 50% which is the upper limit during the wobbling operation, the Z-axis amplitude occurs to a degree greater than is necessary even when the vibration-type actuator is in the non-movement state, which causes an increase in sound pressure level of the abnormal sound.

In contrast, in the first embodiment, as illustrated in FIG. 6, when the wobbling operation is started (in the drive start period), the pulse duty ratio is increased, for example, from 5% to 50% which is the upper limit. When the wobbling operation is stopped (in the non-driving period), the pulse duty ratio is reduced from 50%, which is the upper limit, to, for example, 5%. Furthermore, when the wobbling operation is ended, the pulse duty ratio is reduced to 0%. By adjusting the pulse duty ratio such that no abrupt change occurs in a range outside the dead zone as described above, it is possible to reduce the sound pressure level of the abnormal sound that occurs when the wobbling operation is started and stopped. Furthermore, when the wobbling operation is in the non-movement state, by setting the pulse duty ratio to, for example, 5% thereby minimizing the Z-amplitude, it is possible to minimize the sound pressure level in the non-movement state and to reduce the sound pressure level of the abnormal sound when the movement is started.

That is, when the vibration-type actuator is in the non-movement state, by reducing the amplitude of the vibration in a direction perpendicular to the contact surface at which the driven element is pressed into contact with the vibrator of the vibration-type actuator, it is possible to reduce the abnormal sound that occurs in the non-movement state. by reducing the abrupt change in the ellipticity ratio when the driving of the vibration-type actuator is started and stopped, it is possible to reduce the abnormal sound that occurs when the driving of the vibration-type actuator is started and stopped.

In the above description, it is assumed by way of example but not limitation that the voltage amplitude of the AC signals used as the drive signals is controlled by controlling the pulse duty ratio of the AC signals applied to the voltage up-converter. Note that the voltage amplitude may be controlled in another manner. For example, the absolute value of the AC signal applied to the voltage up-converter may be controlled to control the voltage amplitude of the AC signal applied to the vibrator.

Second Embodiment

In a second embodiment, a driving apparatus of a vibration-type actuator is disclosed that is configured to control a speed by adjusting frequencies (drive frequencies) of a plurality of AC signals applied to a plurality of electrodes of a piezoelectric element and adjusting a phase difference between the AC signals.

In the present embodiment, a method is described for reducing noise when the vibration-type actuator is continuously moved in a same direction by a wobbling operation.

Figure 7A:
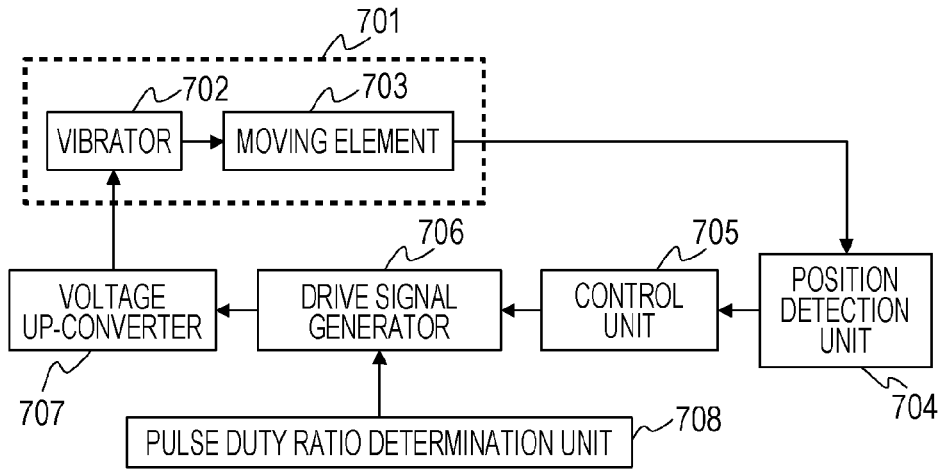
FIGS. 7A and 7B are block diagrams illustrating a drive apparatus of the vibration-type actuator.
Figure 7B:
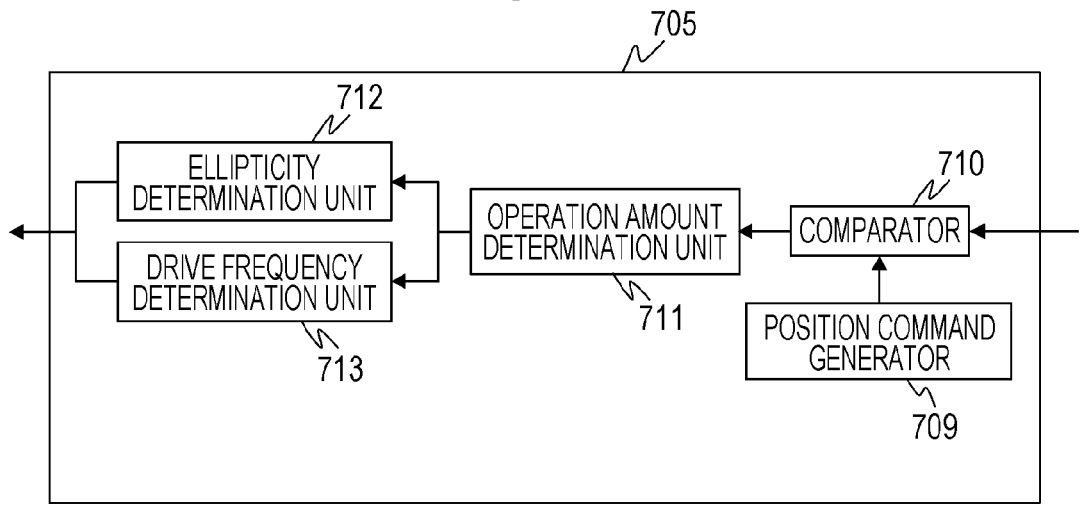

As illustrating in FIG. 7A, a vibration-type actuator 701 includes a vibrator 702 and a driven element 703. The driven element 703 is driven by an elliptic motion excited on protruding parts of the vibrator 702. A position detection unit 704 detects a relative position between the vibrator 702 and the driven element 703 as in the first embodiment. As for the position detection unit 704, for example, a linear encoder may be used. An output of the position detection unit 704 is connected to a control unit 705. The control unit 705 includes, as illustrated in FIG. 7B, a position control generation unit 709, a comparison unit 710, an operation amount determination unit 711, an ellipticity ratio determination unit 712, and a drive frequency determination unit 713. The comparison unit 710 compares a detected position output from the position detection unit 704 with a target position output from the position control generation unit 709. The operation amount determination unit 711 calculates an operation amount to be applied to the vibration-type actuator based on a result of comparison made by the comparison unit 710. The operation amount determination unit 711 may be realized, for example, by a PID control unit. An output of the operation amount determination unit 711 is connected to an ellipticity ratio determination unit 712 that sets an ellipticity ratio in the elliptic motion and a drive frequency determination unit 713 that sets frequencies of AC signals. Based on the output from the operation amount determination unit 711, the ellipticity ratio determination unit 712 sets the ratio of the amplitude of the vibration in a direction parallel to a direction in which the driven element is moved (hereinafter such the amplitude is referred to as the X-axis amplitude), and the ellipticity ratio determination unit 712 sets the phase difference between the AC signal such that the ratio is realized. The drive frequency determination unit 713 sets drive frequencies of AC signals applied to the vibrator 702 based on the output of the operation amount determination unit 711. That is, in the present embodiment, the speed of the driven element is controlled by adjusting the phase difference between the phase differences and drive frequencies thereof depending on the control error.

An output of the ellipticity ratio determination unit 712 and an output of the drive frequency determination unit 713 are connected to a drive signal generation unit 706. The drive signal generation unit 706 generates pulse signal with two phases having a frequency determined by the frequency determination unit and having the ellipticity (phase difference) determined by the ellipticity ratio determination unit 712. The drive signal generation unit 706 is also connected to a pulse duty ratio determination unit 708. The pulse duty ratio determination unit 708 is configured to be capable of setting a pulse duty ratio of the pulse signals with two phases generated by the drive signal generation unit 706. The value of the pulse duty ratio is set for each of the pulse signals with the two phases, and the voltage amplitude of each output AC signal is set according to the pulse duty ratio. The upper limit threshold value of the pulse duty ratio is set to 50%.

Figure 7C:
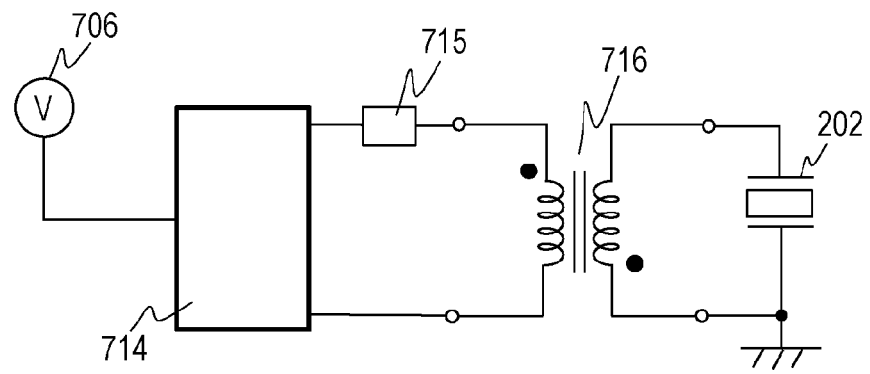
FIG. 7C is a circuit diagram thereof.

An output of the drive signal generation unit 706 is connected to a voltage up-converter 707. The voltage up-converter 707 includes, as illustrated in FIG. 7C, a driver IC 714 (including a switching element), a coil 715, and a transformer 716. The voltage up-converter 707 performs a switching operation on signals according to the pulse signals with the two phases generated by the drive signal generation unit 706, and resultant up-converted AC signals with two phases are applied to the plurality of electrodes of the piezoelectric element of the vibrator 702.

Figure 8:
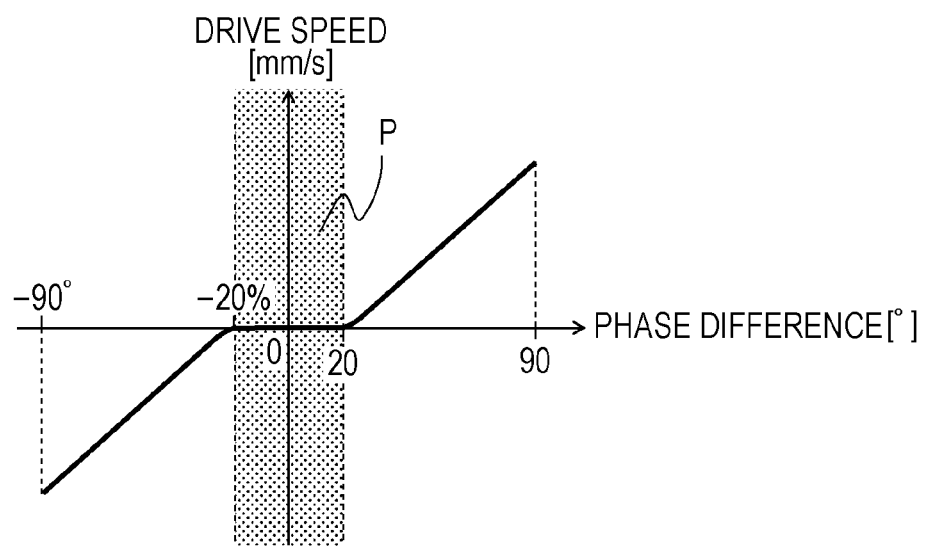
FIG. 8 is a diagram illustrating a relationship between a phase difference and a dead zone.

Next, a dead zone of the ellipticity ratio is described below referring to FIG. 8. FIG. 8 is a diagram illustrating a relationship between a drive speed and a phase difference between AC signals applied to the vibration-type actuator. As illustrated in FIG. 8, when the phase difference between AC signals is changed thereby changing the ellipticity of the elliptic motion while maintaining the pulse duty ratio of the AC signals applied to the piezoelectric element and the drive frequency of the AC signals, the drive speed changes as a particular function of the phase difference. As the phase difference becomes closer to 0, the X-axis amplitude (the amplitude in the driving direction) decreases, and the drive speed decreases. However, when the phase difference is in a dead zone P, the driving force of the vibration-type actuator is lower than the frictional force at the contact surface of the vibrator, and thus the vibration-type actuator stops. Note that if the Z-axis amplitude (the amplitude in the thrust-up direction, that is, in a direction in which the vibrator and the driven element are pressed to each other) is reduced by reducing the pulse duty ratio, the size of the dead zone P of the phase difference increases. Conversely, if the Z-axis amplitude is increased by increasing the pulse duty ratio, the size of the dead zone P of the phase difference decreases.

Although the dead zone P includes equal positive and negative regions in FIG. 8, the sizes of positive and negative regions vary depending on the characteristic of the vibration-type actuator. To obtain a proper size of the dead zone P, it may be necessary to correctly recognize the characteristic of the vibration-type actuator in advance.

Figure 9:
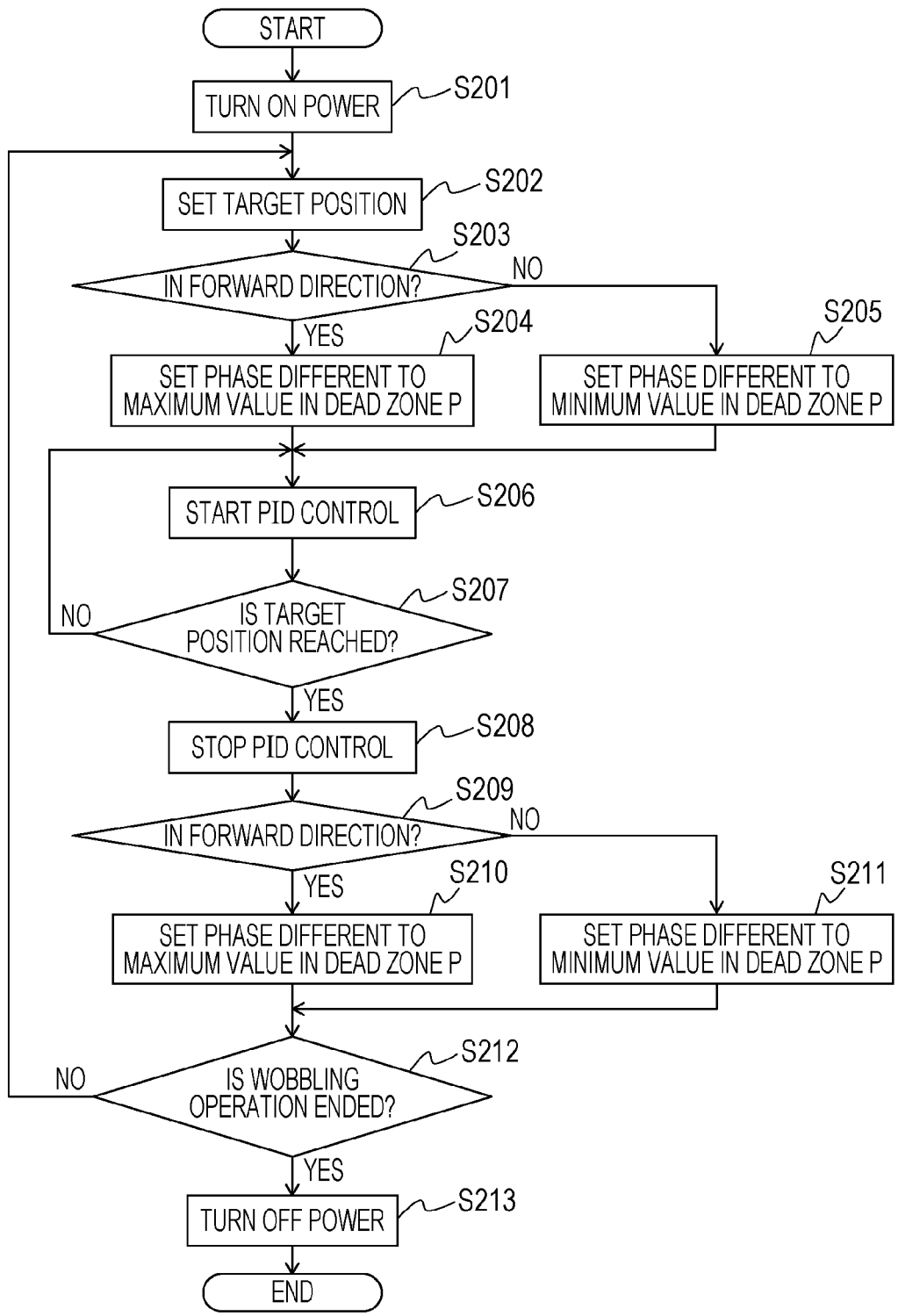
FIG. 9 is a flow chart associated with a wobbling operation.

Next, a control operation according to the second embodiment is described below referring to FIG. 9. FIG. 9 is a flow chart associated with a wobbling operation according to the second embodiment.

As illustrated in FIG. 9, when the wobbling operation is performed, the wobbling operation is started from a state in which AC signals are applied in advance before the driving is started (S201). Next, the target position is set (S202), and a determination is made as to a direction in which a relative movement is made between the vibrator 702 and the driven element 703 (S203). In a case where the moving direction is forward, the phase difference between the AC signals is set to, for example, a maximum value in the dead zone, and more specifically, 20° in the example illustrated in FIG. 8 (S204). In a case where the moving direction is reverse, the phase difference between the AC signals is set to, for example, a minimum value in the dead zone, and more specifically, −20° in the example illustrated in FIG. 8 (S205).

In a case where the above-described phase difference is set to a value in the dead zone, the driving force provided by the vibration-type actuator is not sufficiently large compared with the frictional force at the contact surface of the vibrator, and thus no relative movement between the vibrator and the driven element occurs although a vibration of the vibrator occurs. When the driving is started from a state in which such a vibration is maintained without causing a relative movement to occur, and thus a dynamic friction force is dominant as the frictional force when the driving is started, which makes it possible to start the movement without needing a large force. However, in a case where the phase difference is set to 0° out of the dead zone, a static friction force is dominant as the frictional force when the driving is started from a non-movement state, and thus a large force is temporarily necessary. As a result, a relatively loud abnormal sound occurs when the driving is started. In view of the above, it may be desirable that there exists a drive signal with even a small magnitude when the driving is started, and furthermore it may be desirable that the phase difference is set in a dead zone in which the vibration-type actuator does not move.

When an input is given within the dead zone P, the drive speed is 0 as illustrated in FIG. 8, and thus, to move the vibration-type actuator, it is necessary to sweep the phase difference until the value of the phase difference gets into a range in which the vibration-type actuator is allowed to have a speed. In a case where the phase difference is swept by a large amount, when the driving of the vibrator (vibration-type drive apparatus) is started, a large change occurs in AC signals applied to vibrator, which may cause an abnormal sound to occur. That is, in a case where there is a large difference between the phase difference between the AC signals when the vibrator is in a non-movement state and the phase difference between the AC signals when the driving of the vibrator is started thereafter, a large change occurs in the phase difference when the driving is started, a large change occurs in force applied to the vibrator, which may cause an abnormal sound to occur. When the vibrator is in the non-movement state, the phase difference may be set to the maximum value or the minimum value of the dead zone thereby making it possible to more effectively suppress an abnormal sound when the driving is started thereafter. More specifically, for example, it may be desirable to set the phase difference in advance to 20° or −20°.

When the vibrator is in the non-movement state, if the phase difference is within the dead zone P and is closer, than to 0, to a value of the phase difference with which the driving is started, it is possible to more effectively suppress an abnormal sound that may occur when the driving is started. More specifically, by setting the phase difference to a value within a range from the one-half the maximum value to the maximum value of the dead zone or within a range from the minimum value to the middle between the minimum value to 0, it is possible to further effectively suppress the abnormal sound that may occur. Whether the phase difference is set to a value in a range closer to the maximum value or the minimum value is determined by a value that the phase difference has when the driving is restarted after the non-movement state. More specifically, the value may be in a range that allows the phase difference from which is driving is started to be closer to the set phase difference than in the other range.

As described above, by setting the phase difference to a value within the dead zone other than 0 when the driving is started, it is possible to suppress the abnormal sound. More specifically, by setting the phase difference to a value within a range (10° to 20°) from the one-half the maximum value to the maximum value of the dead zone or within a range (−10° to −20°) from the minimum value to the middle between the minimum value to 0, it is possible to more effectively reduce the abnormal sound. Furthermore, by setting the phase difference to the maximum value of the dead zone, it is possible to further effectively reduce the abnormal sound.

Next, the drive frequency of the AC signals and the phase difference (ellipticity) are set to values depending on the position deviation using the position feedback control such as the PID control (S206). Note that in S206, a limiter is provided such that the phase difference between the AC signals determined by the PID control does not fall in the dead zone P shown in FIG. 8. Next, it is determined whether the vibration-type actuator has reached the target position (S207). In a case where the target position has been reached, the position feedback control such as the PID control is ended (S208). A determination is then made as to a direction in which the vibration-type actuator is driven (S209), and the phase difference between the AC signals is gradually increased or reduced to a value in the dead zone depending on the direction in which the vibration-type actuator is driven. For example, in a case where the driving direction is forward, the phase difference between the AC signals is set to the maximum value in the dead zone, and more specifically, 20° in the example illustrated in FIG. 8 (S210). In a case where the driving direction is reverse, the phase difference between the AC signals is set to the minimum value in the dead zone, and more specifically, −20° in the example illustrated in FIG. 8 (S211). In a case where the target position is not reached yet, the vibration-type actuator is moved to the target position using the position feedback control such as the PID control. Finally, it is determined whether the wobbling operation is to be ended (S212). In a case where the wobbling operation is to be ended, the power is turned off (S213). In a case where the wobbling operation is further continued, in the present embodiment, the driving direction is the same as the previous driving direction, and thus the phase difference between the AC signals set in the non-movement state is maintained. A next target position is set, and the driving of the vibration-type actuator is started so as to move the vibration-type actuator toward the target position using the position feedback control such as the PID control.

Figure 10:
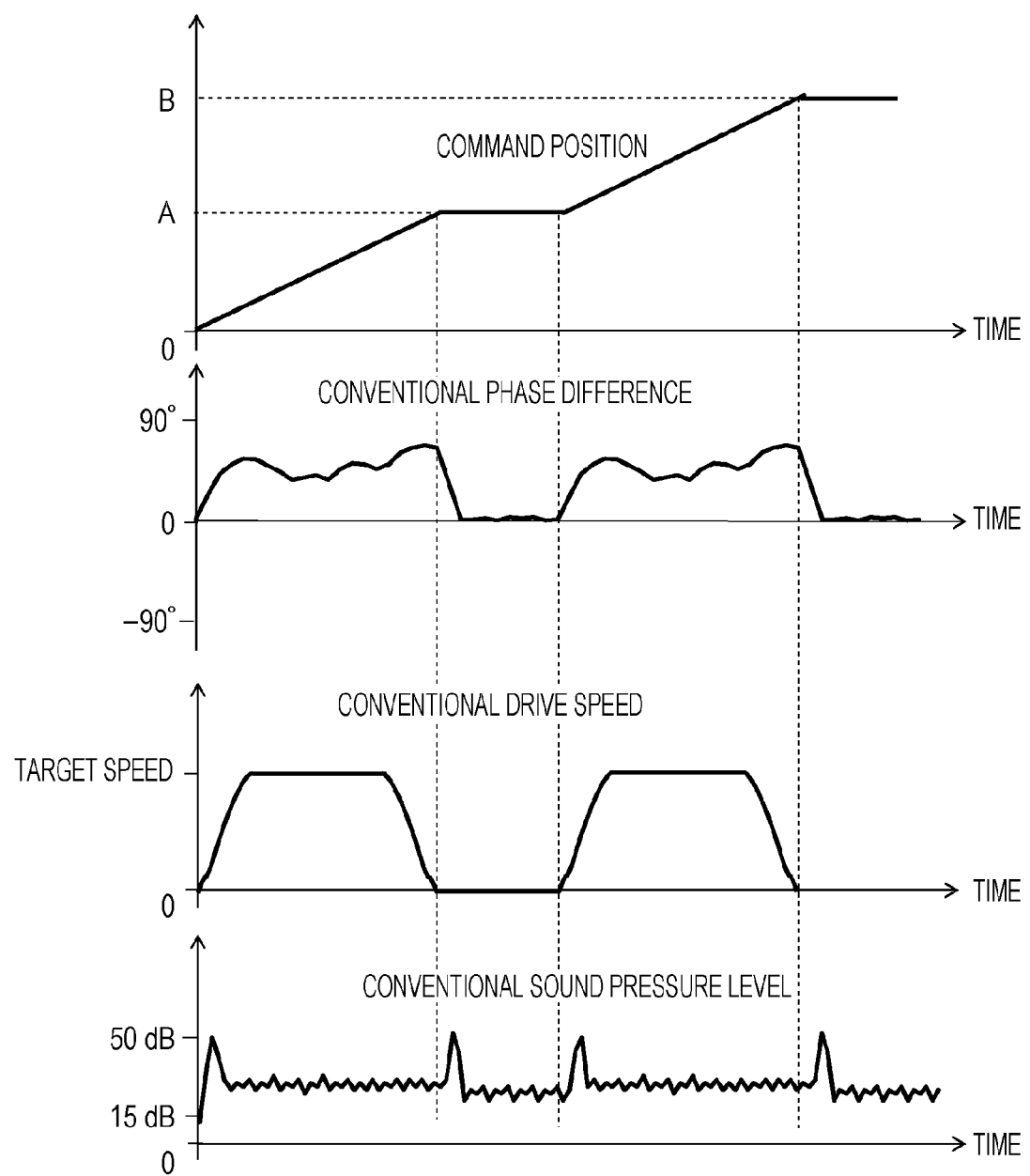
FIG. 10 is a diagram illustrating relationships among a commanded position, a phase difference between alternate current signals, a drive speed, and a sound pressure level, in a drive apparatus of the vibration-type actuator.
Figure 11:
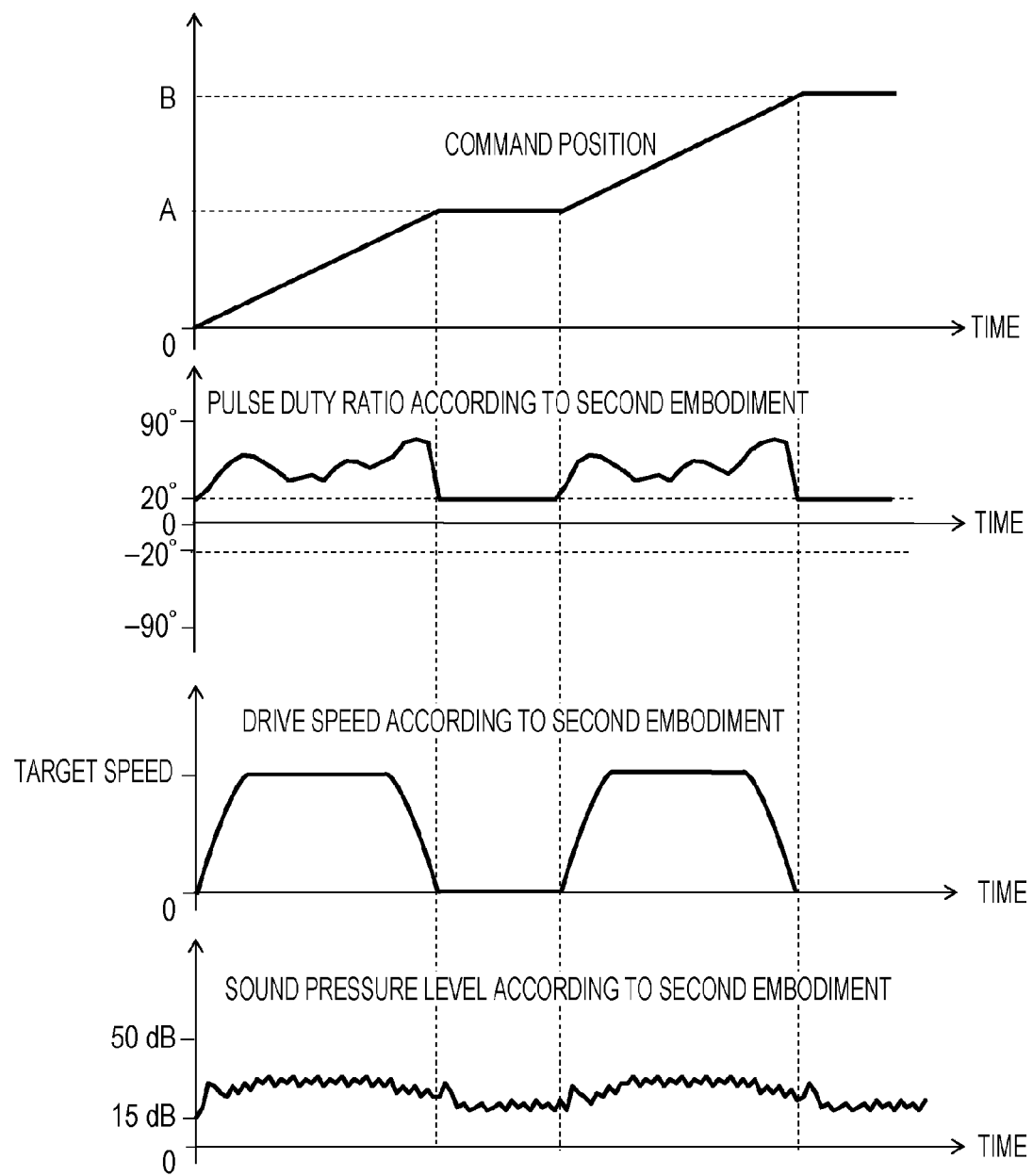
FIG. 11 is a diagram illustrating relationships among a commanded position, a phase difference between alternate current signals, a drive speed, and a sound pressure level, in a drive apparatus of the vibration-type actuator.

Beneficial effects obtained according to the second embodiment are described below referring to FIG. 10. FIG. 10 is a diagram illustrating relationships among the commanded position, the phase difference between the AC signals, the drive speed, and the sound pressure level when the wobbling operation is performed using a vibration-type actuator according to a conventional technique. FIG. 11 is a diagram illustrating relationships among the commanded position, the phase difference between the AC signals, the drive speed, and the sound pressure level when the wobbling operation is performed using the vibration-type actuator according to the second embodiment.

As illustrated in FIG. 10, in the wobbling operation according to the conventional technique, the base value of the phase difference of the AC signals is set to 0°, and the phase difference of the AC signals is set to a value corresponding to a position deviation by using the position feedback control such as the PID control. Because the phase difference between the AC signals has a dead zone as described above, when the moving of the vibration-type actuator is started or stopped, an abrupt change occurs in the X-axis amplitude of the elliptic motion at the contact elements and thus an increase in sound pressure level occurs. In contrast, in the second embodiment, as illustrated in FIG. 11, when the wobbling operation is started, the control of the phase difference between the AC signals is started with, for example, 20°. When the wobbling operation is stopped, the phase difference is reduced to 20°. By controlling the phase difference in the above-described manner, it is possible to suppress the abrupt change in vibration of the vibration-type actuator and thus it is possible to reduce the sound pressure level of the abnormal sound that may occur when the wobbling operation is started or stopped. Note that the phase difference between the AC signals is maintained at 20° when the wobbling operation is in the non-movement state. By maintaining the phase difference in such a manner, it is possible to suppress an abrupt change in vibration of the vibration-type actuator when the moving of the vibration-type actuator is started toward a next target position without increasing the sound pressure level of the abnormal sound that may occur in the non-movement state.

That is, in the second embodiment, the base value of the phase difference of the AC signals is set to a value offset from 0 thereby suppressing an abrupt change in vibration of the vibration-type actuator in the position feedback control such as the PID control. As a result, it becomes possible to reduce the sound pressure level of the abnormal sound that may occur when the wobbling operation is started or stopped.

Third Embodiment

A drive apparatus of a vibration-type actuator according to a third embodiment is described below.

In the second embodiment described above, the method is disclosed for reducing noise when the vibration-type actuator is driven repeatedly in the same direction. The present embodiment discloses a method of reducing noise when the vibration-type actuator is driven in a reverse direction. The operation according to the present embodiment is similar to that according to the second embodiment except that the vibration-type actuator is driven in the reverse direction, and thus a duplicated description is not given below.

First, a control operation according to the third embodiment is described below referring to FIG. 9.

As illustrated in FIG. 9, when the wobbling operation is performed, the wobbling operation is started from a state in which AC signals are applied in advance before the driving is started (S201). Next, the target position is set (S202), and a determination is made as to a direction in which the vibration-type actuator is to be driven (S203). In a case where the driving direction is forward, the phase difference between the AC signals is set to the maximum value in the dead zone, and more specifically, 20° in the example illustrated in FIG. 8 (S204). In a case where the driving direction is reverse, the phase difference between the AC signals is set to the minimum value in the dead zone, and more specifically, −20° in the example illustrated in FIG. 8 (S205). Next, the drive frequency of the AC signals and the phase difference (ellipticity) are set to values depending on the position deviation using the position feedback control such as the PID control (S206). Note that in S206, a limiter is provided such that the phase difference between the AC signals determined by the PID control does not fall in the dead zone P shown in FIG. 8.

Next, it is determined whether the vibration-type actuator has reached the target position (S207). In a case where the target position has been reached, the position feedback control such as the PID control is ended (S208). In this case, in S209, a determination is made as to the direction of driving the vibration-type actuator, and the phase difference between the AC signals is gradually increased or reduced to a value in the dead zone depending on the determined driving direction. For example, in a case where the driving direction is forward, the phase difference between the AC signals is set to the maximum value in the dead zone, and more specifically, 20° in the example illustrated in FIG. 8 (S210). In a case where the driving direction is reverse, the phase difference between the AC signals is set to the minimum value in the dead zone, and more specifically, −20° in the example illustrated in FIG. 8 (S211). In a case where the target position is not reached yet, the vibration-type actuator is moved to the target position using the position feedback control such as the PID control.

Finally, it is determined whether the wobbling operation is to be ended (S212). In a case where the wobbling operation is to be ended, the power is turned off (S213). In a case where the wobbling operation is further continued, because the next driving is to be performed in the reverse direction, the phase difference between the AC signals is increased or decreased in the non-movement state. For example, in a case where the determination in S209 indicates that the direction of driving the vibration-type actuator is to be switched from the forward direction to the reverse direction, the value set in S210 is gradually reduced from the positive value to a negatively value until −20° is reached. On the other hand, in a case where the determination in S209 indicates that the direction of driving the vibration-type actuator is to be switched from the reverse direction to the forward direction, the value set in S211 is gradually increased from the negative value to a positive value until 20° is reached. Thereafter, a next target position is set, and the driving of the vibration-type actuator is started so as to move the vibration-type actuator toward the target position using the position feedback control such as the PID control.

Figure 12:
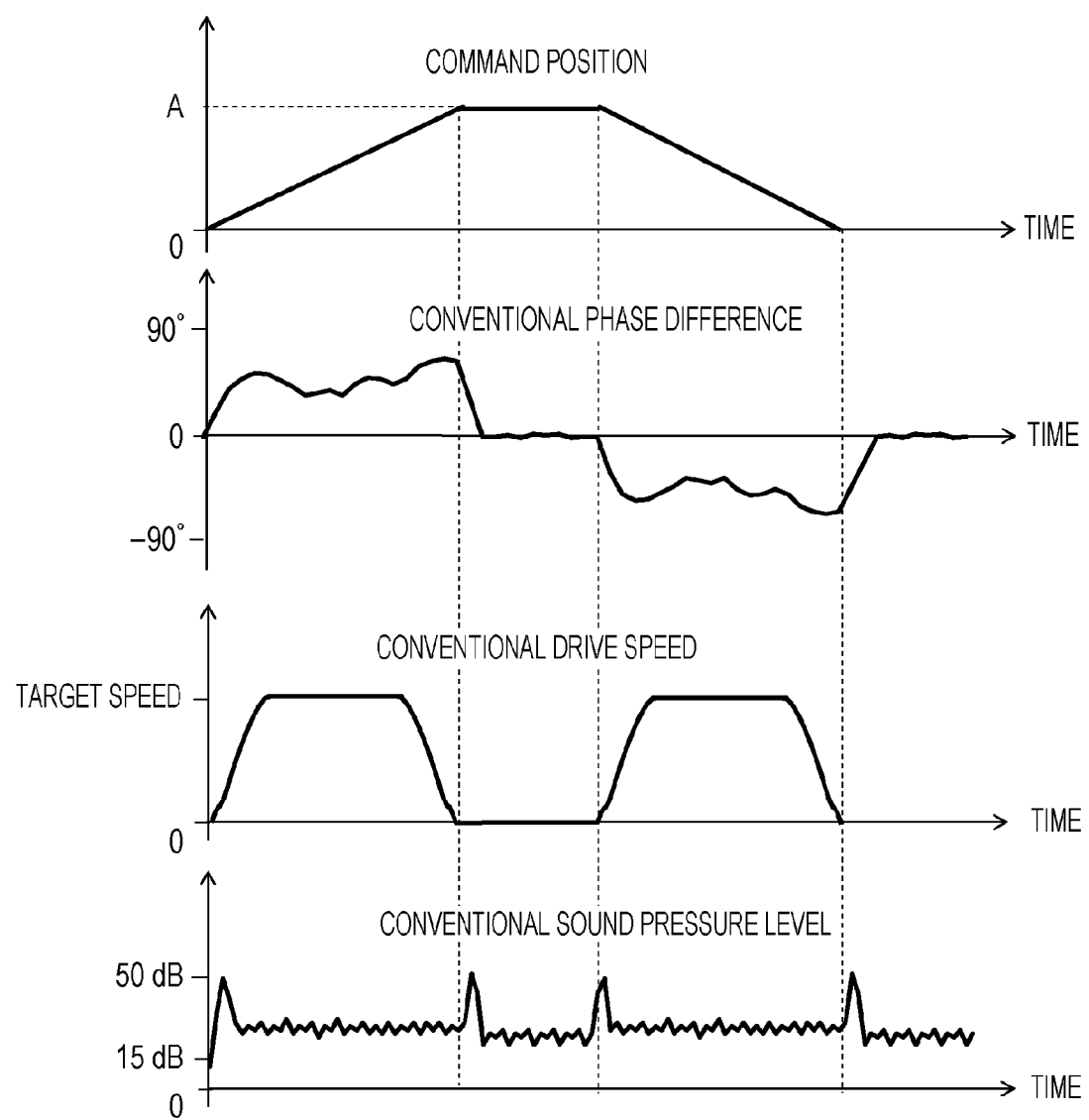
FIG. 12 is a diagram illustrating relationships among a commanded position, a phase difference between alternate current signals, a drive speed, and a sound pressure level, in a drive apparatus of the vibration-type actuator.
Figure 13:
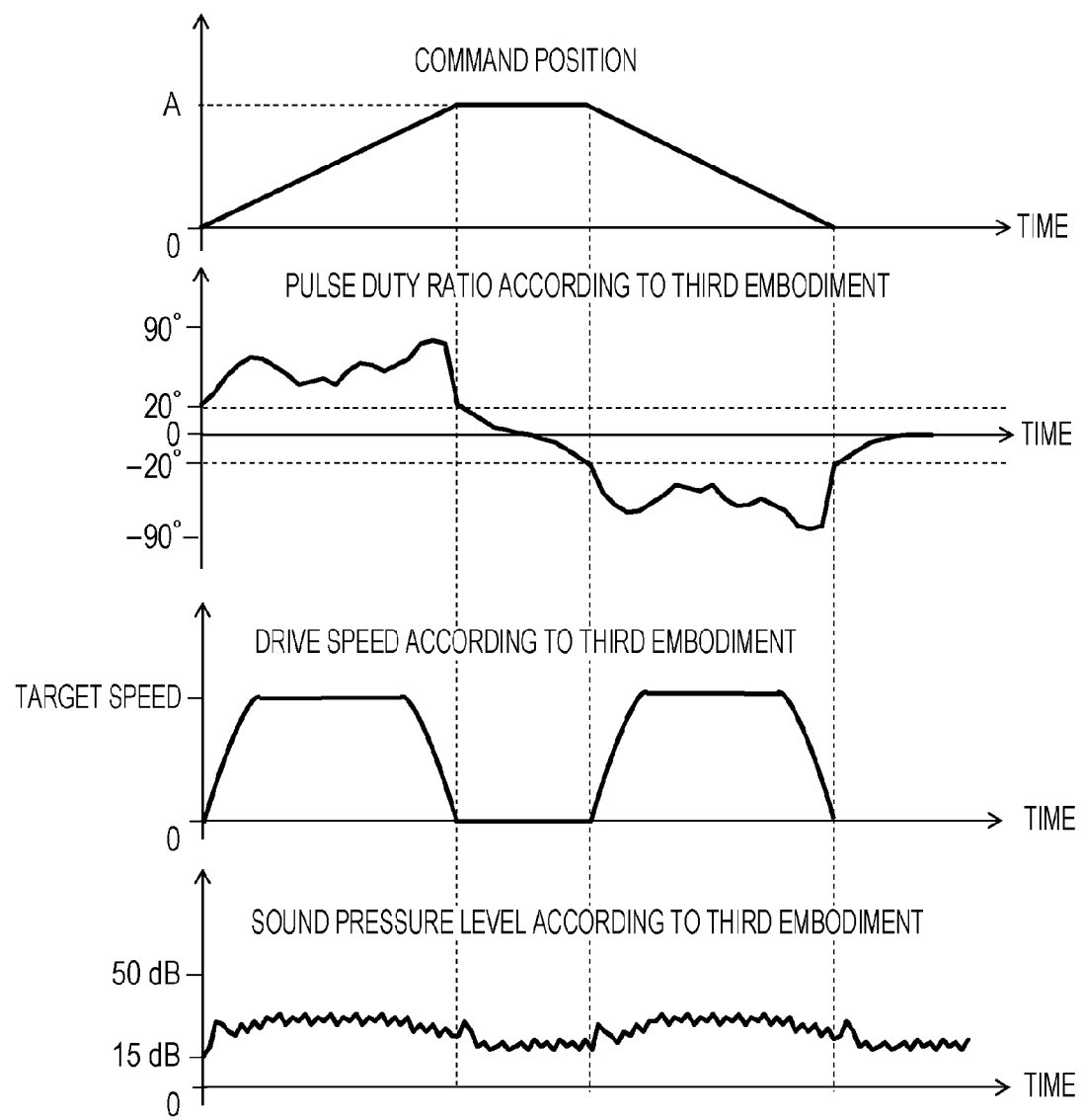
FIG. 13 is a diagram illustrating relationships among a commanded position, a phase difference between alternate current signals, a drive speed, and a sound pressure level, in a drive apparatus of the vibration-type actuator.

Beneficial effects obtained according to the third embodiment are described below referring to FIG. 12. FIG. 12 is a diagram illustrating relationships among the commanded position, the phase difference between the AC signals, the drive speed, and the sound pressure level when the wobbling operation is performed using a vibration-type actuator according to a conventional technique. FIG. 13 is a diagram illustrating relationships among the commanded position, the phase difference between the AC signals, the drive speed, and the sound pressure level when the wobbling operation is performed using the vibration-type actuator according to the third embodiment.

As illustrated in FIG. 12, in the wobbling operation according to the conventional technique, the base value of the phase difference of the AC signals is set to 0°, and the phase difference of the AC signals is set to a value corresponding to a position deviation by using the position feedback control such as the PID control. Because the phase difference between the AC signals has a dead zone as described above, when the moving of the vibration-type actuator is started or stopped, an abrupt change occurs in the X-axis amplitude of the elliptic motion at the contact elements and thus an increase in sound pressure level occurs. In contrast, in the third embodiment, as illustrated in FIG. 13, when the wobbling operation is started, the control of the phase difference between the AC signals is started with, for example, 20°. When the wobbling operation is stopped, the phase difference is reduced to 20°. By controlling the phase difference in the above-described manner, it is possible to suppress the abrupt change in vibration of the vibration-type actuator and thus it is possible to reduce the sound pressure level of the abnormal sound that may occur when the wobbling operation is started or stopped. Also in the case where the driving direction is switched, the phase difference between the AC signals is controlled in the state in which the wobbling operation stops such that the phase difference is reduced from 20° to −20°. By controlling the phase difference in the above-described manner, it is possible to suppress an abrupt change in vibration of the vibration-type actuator when the moving of the vibration-type actuator is started toward a next target position without increasing the sound pressure level of the abnormal sound that may occur in the non-movement state.

Fourth Embodiment

In a fourth embodiment, a driving apparatus of a vibration-type actuator is disclosed that is configured to control a speed by adjusting frequencies (drive frequencies) of a plurality of AC signals applied to a plurality of electrodes of a piezoelectric element and adjusting a phase difference between the AC signals. The fourth embodiment is different from the third embodiment in that in a state in which the driven element stops, both the phase difference and the pulse duty ratio are adjusted.

The driving apparatus of the vibration-type actuator according to the present embodiment may be similar in configuration and circuit to that according to the second or third embodiment, and thus a further description of the configuration and the circuit is omitted.

Figure 14:
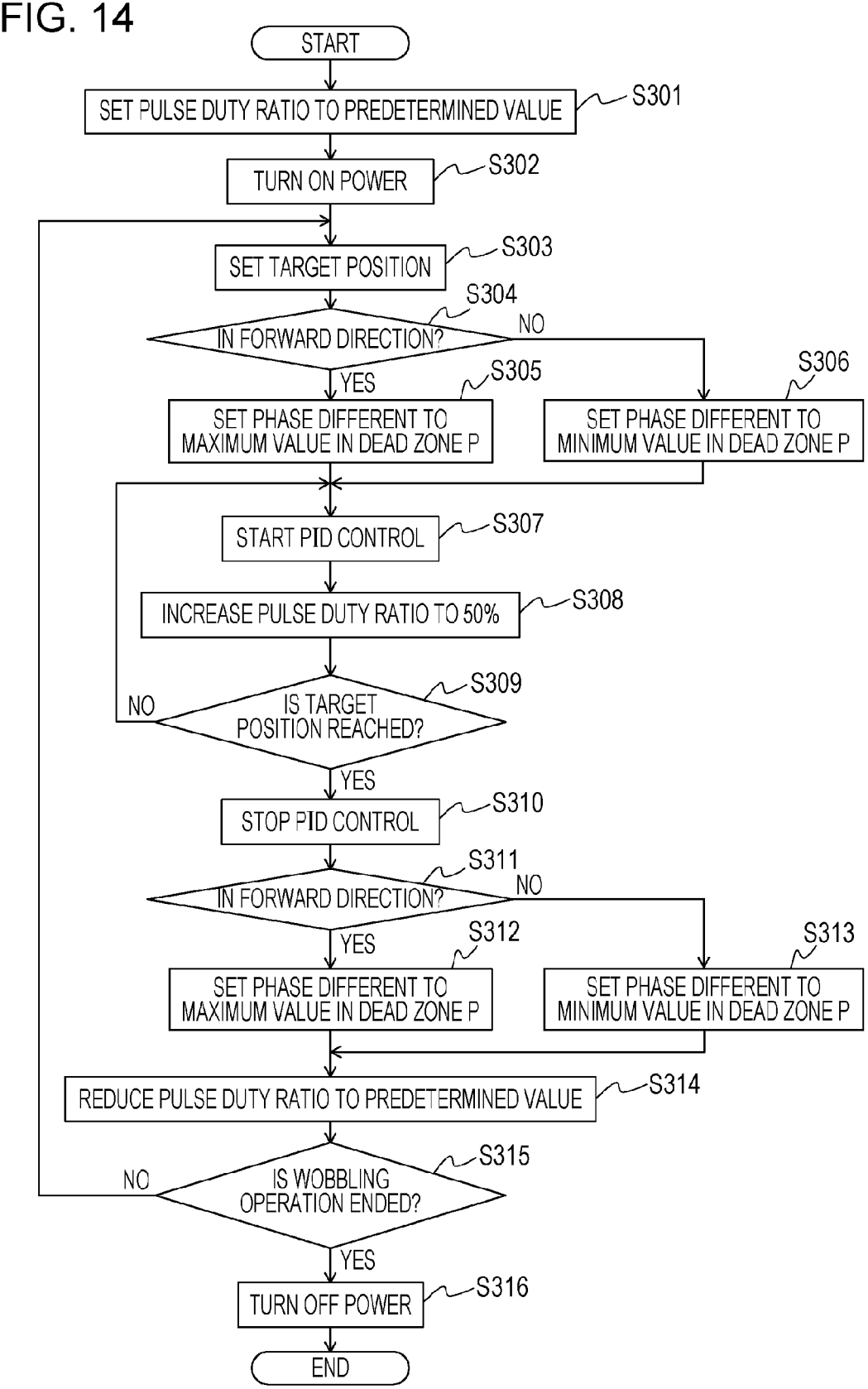
FIG. 14 is a flow chart associated with a wobbling operation.

First, a control operation according to the fourth embodiment is described below referring to FIG. 14. FIG. 14 is a flow chart associated with a wobbling operation according to the fourth embodiment.

In the wobbling operation, as illustrated in FIG. 14, the pulse duty ratio is set to predetermined value before the driving operation is started (S301), and the wobbling operation is started from a state in which the AC signals are applied in advance (S302). The above-described value predetermined for the pulse duty ratio of the AC signals is set to, for example, a maximum value in the dead zone, and more specifically, 5% as in the example illustrated in FIG. 3. Next, the target position is set (S303), and a determination is made as to a direction in which the vibration-type actuator is to be driven (S304). In a case where the driving direction is forward, the phase difference between the AC signals is set to the maximum value in the dead zone, and more specifically, 20° in the example illustrated in FIG. 8 (S305). In a case where the driving direction is reverse, the phase difference between the AC signals is set to the minimum value in the dead zone, and more specifically, −20° in the example illustrated in FIG. 8 (S306). Next, the drive frequency and the phase difference of the AC signals are set to values corresponding to the position deviation (S307), and the vibration-type actuator is moved to the target position using the position feedback control such as the PID control.

Note that in S307, a limiter is provided such that the phase difference between the AC signals determined by the PID control does not fall in the dead zone P. Furthermore, the pulse duty ratio is gradually increased from 5% to the upper limit, and more specifically, 50% as in the example illustrated in FIG. 3 (S308). Next, it is determined whether the vibration-type actuator has reached the target position (S309). In a case where the target position has been reached, the position feedback control such as the PID control is ended (S310). In this case, the phase difference between the AC signals is gradually increased or reduced to the particular value depending on the determination in S311 as to the direction of driving the vibration-type actuator. For example, in a case where the driving direction is forward, the phase difference between the AC signals is set to the maximum value in the dead zone, and more specifically, 20° in the example illustrated in FIG. 8 (S312). In a case where the driving direction is reverse, the phase difference between the AC signals is set to the minimum value in the dead zone, and more specifically, −20° in the example illustrated in FIG. 8 (S313). Subsequently, the pulse duty ratio of the AC signals is gradually reduced from the upper limit of 50% to the predetermined value, that is, 5% as illustrated in FIG. 3 (S314), and this value is maintained during a period in which the wobbling operation is in non-movement state. In a case where the target position is not reached yet, the vibration-type actuator is moved to the target position using the position feedback control such as the PID control. Finally, it is determined whether the wobbling operation is to be ended (S315). In a case where the wobbling operation is to be ended, applying of the AC signals is ended and the power is turned off (S316). In a case where the wobbling operation is further continued, because next driving is to be performed in the same direction as that in the previous driving, the phase difference between the AC signals set in the non-movement state is maintained.

A next target position is set, and the driving of the vibration-type actuator is started so as to move the vibration-type actuator toward the target position using the position feedback control such as the PID control.

Figure 15:
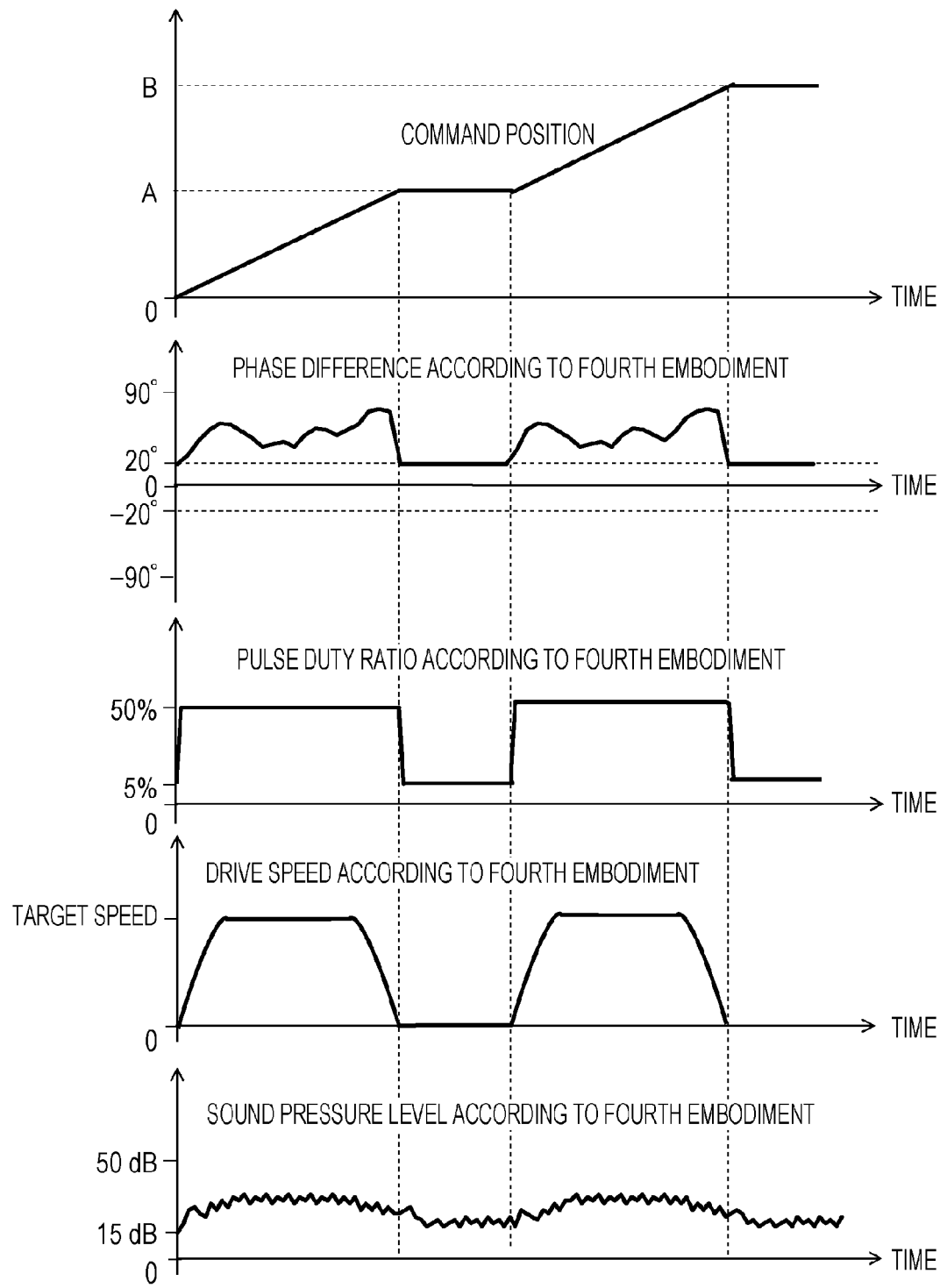
FIG. 15 is a diagram illustrating relationships among a commanded position, a pulse duty ratio, a drive speed, and a sound pressure level, in a drive apparatus of the vibration-type actuator.

Beneficial effects obtained according to the fourth embodiment are described below referring to FIG. 15. FIG. 15 is a diagram illustrating relationships among the commanded position, the phase difference between the AC signals, the pulse duty ratio, the drive speed, and the sound pressure level when the wobbling operation is performed using the vibration-type actuator according to the fourth embodiment.

In the fourth embodiment, by setting both the phase difference of the AC signals and the pulse duty ratio to values in the manner, for example, as illustrated in FIG. 15, it is possible to suppress abrupt changes in the X-axis amplitude and the Z-axis amplitude, and thus it is possible to more effectively reduce the sound pressure level of the abnormal sound that may occur when the driving of the driving of the vibration-type actuator is started or stopped. That is, in the fourth embodiment, values in the non-movement state for the phase difference of AC signals and the pulse duty ratio are adjusted within the respective dead zones so as to suppress an abrupt change in vibration of the vibration-type actuator when the position feedback control such as the PID control is performed. Thus it is possible to ensure the reduction in the sound pressure level of the abnormal sound that may occur when the driving of the vibration-type actuator is started or stopped.

In the embodiment described above, the method of controlling the AC signals has been described referring to FIG. 15 for the case where the vibration-type actuator is driven repeatedly in the same direction by the wobbling operation. Note that when the vibration-type actuator is driven in the reverse direction, the phase difference of AC signals may be controlled using the method disclosed in the third embodiment thereby achieving similar beneficial effects.

Note that a unit that generates AC signals according to the present disclosure corresponds to a mixture of the drive signal generation unit and the voltage up-converter described above, and an adjustment unit according to the present disclosure corresponds to the control unit described above or a mixture of the control unit and the pulse duty ratio determination circuit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-244999 filed Nov. 27, 2013 and No. 2014-227260 filed Nov. 7, 2014, which are hereby incorporated by reference herein in their entirety.

What is claimed is:

1. A drive apparatus of a vibration-type actuator comprising:
   an alternate current signal generation unit configured to generate a first alternate current signal applied to a first electrode of an electric-mechanical energy conversion element of a vibrator and a second alternate current signal applied to a second electrode of the electric-mechanical energy conversion element; and
   a control unit configured to set a voltage amplitude of the first alternate current signal and a voltage amplitude of the second alternate current signal such that when the vibrator is in a non-movement state, the voltage amplitudes are set to be greater than 0 and to be in a dead zone, wherein the dead zone is a range of the voltage amplitudes of the first alternate current signal and the second alternate current signal applied to the electric-mechanical energy conversion element, within which no driving force on a driven element is generated.

2. The drive apparatus of the vibration-type actuator according to claim 1, wherein the control unit is configured to control the first alternate current signal and the second alternate current signal such that a driven state of the vibrator and the non-movement state of the vibrator appear alternately.

3. The drive apparatus of the vibration-type actuator according to claim 1, wherein the alternate current signal generation unit includes a drive signal generation unit configured to generate pulse signals, and a voltage up-converter configured to generate the first alternate signal and the second alternate signal corresponding to the pulse signals.

4. The drive apparatus of the vibration-type actuator according to claim 3, wherein the control unit controls the voltage amplitudes of the first alternate signal and the second alternate signal by controlling pulse duty ratios of the pulse signals.

5. The drive apparatus of the vibration-type actuator according to claim 1, wherein the control unit sets the pulse duty ratio such that the pulse duty ratios of the pulse signals each are equal to an maximum value of the dead zone during a non-driven period of the vibration-type actuator.

6. The drive apparatus of the vibration-type actuator according to claim 1, wherein the control unit determines an ellipticity ratio of an elliptic motion occurring on the vibrator and determines a phase difference of the first and second alternate signals based on the ellipticity.

7. The drive apparatus of the vibration-type actuator according to claim 1, wherein the driven element is relatively moved by a combination of a first vibration mode that occurs on the vibrator when the first alternate current signal and the second alternate current signal are equal in phase and a second vibration mode that occurs on the vibrator when the first alternate current signal and the second alternate current signal are opposite in phase.

8. An interchangeable lens comprising:
a focus lens;
a vibration-type actuator configured to drive the focus lens; and
the driving apparatus configured to drive the vibration-type actuator according to claim 1.

9. An image pickup apparatus comprising:
a lens;
a vibration-type actuator configured to drive the lens;
the driving apparatus configured to drive the vibration-type actuator according to claim 1; and
an image sensor disposed on an optical axis of the lens.

10. The image pickup apparatus according to claim 9, wherein the non-movement state is one state of the vibrator in which the vibrator is when the lens is in focus.

11. A drive apparatus of a vibration-type actuator comprising:
an alternate current signal generation unit configured to generate a first alternate current signal applied to a first electrode of an electric-mechanical energy conversion element of a vibrator and a second alternate current signal applied to a second electrode of the electric-mechanical energy conversion element; and
a control unit configured to set a phase difference between the first alternate current signal and the second alternate current signal such that when the vibrator is in a non-movement state, the phase difference is set to a value in a dead zone other than 0, wherein the dead zone is a range of the phase difference between the first alternate current signal and the second alternate current signal applied to the electric-mechanical energy conversion element, within which no driving force on a driven element is generated.

12. The drive apparatus of the vibration-type actuator according to claim 11, wherein
the control unit is configured to set the phase difference to a particular value that is not equal to 0 and that is within the dead zone, and
wherein the particular value is set within a range between 0 and a selected one of a minimum value and a maximum value of the dead zone such that the selected one of the minimum value and the maximum value is closer, than the other one is, to a phase difference that occurs when driving is performed after the non-movement state.

13. The drive apparatus of the vibration-type actuator according to claim 11, wherein the control unit is configured to control the first alternate current signal and the second alternate current signal such that a driven state of the vibrator and the non-movement state of the vibrator appear alternately.

14. The drive apparatus of the vibration-type actuator according to claim 11, wherein the alternate current signal generation unit includes
a drive signal generation unit configured to generate pulse signals, and
a voltage up-converter configured to generate the first alternate signal and the second alternate signal corresponding to the pulse signals.

15. The drive apparatus of the vibration-type actuator according to claim 11, wherein the control unit sets the phase difference such that during a non-driving period in which the vibration-type actuator is not driven, the phase difference has a value equal to a minimum value or a maximum value of the dead zone depending on a moving direction.

16. The drive apparatus of the vibration-type actuator according to claim 11, wherein the control unit determines an ellipticity ratio of an elliptic motion occurring on the vibrator and determines a phase difference of the first and second alternate signals based on the ellipticity.

17. The drive apparatus of the vibration-type actuator according to claim 11, wherein the driven element is relatively moved by a combination of a first vibration mode that occurs on the vibrator when the first alternate current signal and the second alternate current signal are equal in phase and a second vibration mode that occurs on the vibrator when the first alternate current signal and the second alternate current signal are opposite in phase.

18. An interchangeable lens, comprising:
a focus lens;
a vibration-type actuator configured to drive the focus lens; and
the driving apparatus configured to drive the vibration-type actuator according to claim 11.

19. An image pickup apparatus comprising:
a lens,
a vibration-type actuator configured to drive the lens;
the driving apparatus configured to drive the vibration-type actuator according to claim 11; and
an image sensor disposed on an optical axis of the lens.

20. The image pickup apparatus according to claim 19, wherein the non-movement state is one state of the vibrator in which the vibrator is when the lens is in focus.

* * * * *